(12) United States Patent
Strandberg

(10) Patent No.: US 11,573,638 B2
(45) Date of Patent: *Feb. 7, 2023

(54) FACILITATING INTERACTION WITH A VEHICLE TOUCHSCREEN USING HAPTIC FEEDBACK

(71) Applicant: Volvo Car Corporation, Gothenburg (SE)

(72) Inventor: Mats Strandberg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,073

(22) Filed: Aug. 24, 2021

(65) Prior Publication Data

US 2021/0382558 A1  Dec. 9, 2021

Related U.S. Application Data

(63) Continuation of application No. 17/034,897, filed on Sep. 28, 2020, now Pat. No. 11,126,269, which is a (Continued)

(51) Int. Cl.
*G06F 3/01* (2006.01)
*B60K 35/00* (2006.01)
(Continued)

(52) U.S. Cl.
CPC ............ *G06F 3/016* (2013.01); *B60K 35/00* (2013.01); *G06F 3/0416* (2013.01); *G06F 3/0488* (2013.01); *B60K 2370/1438* (2019.05)

(58) Field of Classification Search
CPC ...... G06F 3/016; G06F 3/0416; G06F 3/0488; B60K 35/00; B60K 2370/1438
See application file for complete search history.

(56) References Cited

U.S. PATENT DOCUMENTS 8,482,534 B2  7/2013  Pryor
9,946,345 B2  4/2018  Park et al.
(Continued)

FOREIGN PATENT DOCUMENTS

DE  10 2012 216 455 A1  3/2014

OTHER PUBLICATIONS

Non-Final Office Action received for U.S. Appl. No. 16/272,740 dated Feb. 24, 2020, 21 pages.
(Continued)

*Primary Examiner* — Dmitriy Bolotin
(74) *Attorney, Agent, or Firm* — Amin, Turocy & Watson, LLP

(57) ABSTRACT

Techniques are described for interacting with a vehicle touchscreen. According to one or more embodiments, a system is provided comprising a processor that executes computer executable components stored in at least one memory, including a display control component that selects graphical touch controls to include in a graphical user interface (GUI) for rendering on the touchscreen based on activation of a haptic feedback mode for interfacing with the touchscreen, wherein the graphical touch controls correspond to controls for one or more applications or functions associated with the vehicle. The system further comprising a positioning component that determines a location of a finger on or over the touchscreen relative to the graphical touch controls as displayed on the touchscreen, and a haptic feedback component that causes a vibration unit of the vehicle to provide vibration feedback based on the location corresponding to a graphical touch control of the graphical touch controls.

20 Claims, 14 Drawing Sheets

Related U.S. Application Data continuation of application No. 16/272,740, filed on Feb. 11, 2019, now Pat. No. 10,817,063.

(51) Int. Cl.
*G06F 3/041* (2006.01)
*G06F 3/0488* (2022.01)

(56) References Cited

U.S. PATENT DOCUMENTS

| | | | |
|---|---|---|---|
| 10,817,063 B2* | 10/2020 | Strandberg | G06F 1/3206 |
| 11,126,269 B2* | 9/2021 | Strandberg | G06F 3/016 |
| 2009/0085878 A1 | 4/2009 | Heubel et al. | |
| 2010/0005412 A1 | 1/2010 | Tauchi et al. | |
| 2010/0156818 A1 | 6/2010 | Burrough et al. | |
| 2010/0267424 A1 | 10/2010 | Kim et al. | |
| 2011/0301806 A1* | 12/2011 | Messier | G01C 21/3484 701/423 |
| 2013/0145065 A1* | 6/2013 | Ricci | G06V 20/59 710/241 |
| 2014/0176455 A1 | 6/2014 | Araki | |
| 2014/0181715 A1 | 6/2014 | Axelrod et al. | |
| 2014/0309806 A1 | 10/2014 | Ricci | |
| 2016/0195932 A1 | 7/2016 | Czelnik et al. | |
| 2017/0228126 A1 | 8/2017 | Kim et al. | |
| 2018/0088770 A1 | 3/2018 | Brombach et al. | |
| 2018/0118199 A1 | 5/2018 | Chaney, Jr. et al. | |
| 2018/0217717 A1 | 8/2018 | Yasuda et al. | |
| 2018/0284764 A1 | 10/2018 | Asghar et al. | |
| 2020/0309547 A1* | 10/2020 | Davidsson | G06F 16/783 |
| 2021/0011554 A1* | 1/2021 | Strandberg | G06F 1/1643 |

OTHER PUBLICATIONS

European Search Report and Written Opinion for European Application No. EP 20 15 6776 dated Jun. 22, 2020, 8 pages.

Non-Final Office Action received for U.S. Appl. No. 17/034,897 dated Nov. 24, 2020, 42 pages.

Communication Pursuant to Article 94(3) EPC received for EP Patent Application Serial No. 20156776.5 dated May 12, 2021, 13 pages.

* cited by examiner

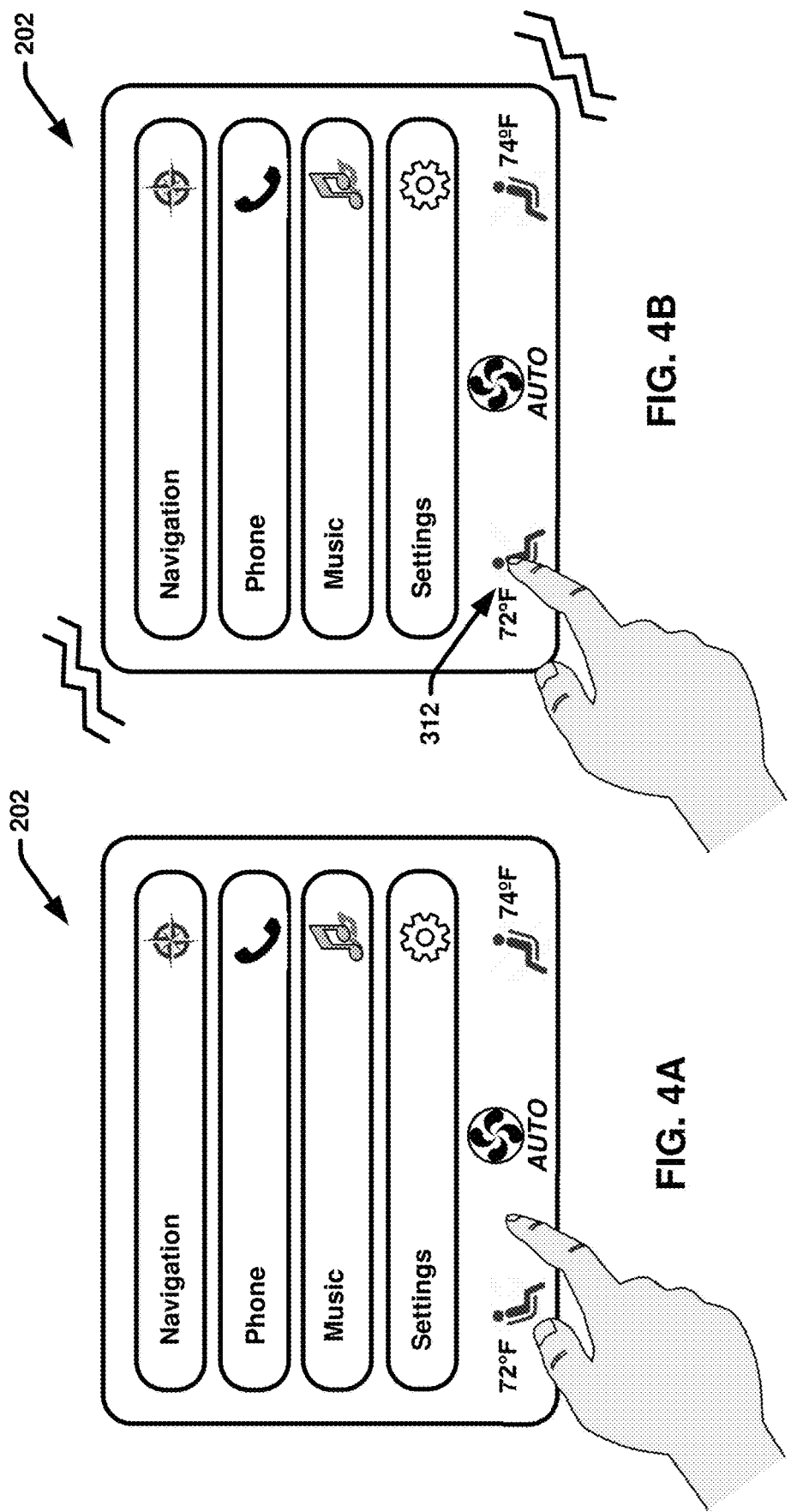

US 11,573,638 B2

FACILITATING INTERACTION WITH A VEHICLE TOUCHSCREEN USING HAPTIC FEEDBACK

CROSS REFERENCE TO RELATED APPLICATIONS

This application is a continuation of, and claims priority to each of, pending U.S. patent application Ser. No. 17/034,897, filed on Sep. 28, 2020, entitled "FACILITATING INTERACTION WITH A VEHICLE TOUCHSCREEN USING HAPTIC FEEDBACK", which is a continuation of U.S. patent application Ser. No. 16/272,740, filed on Feb. 11, 2019, entitled "FACILITATING INTERACTION WITH A VEHICLE TOUCHSCREEN USING HAPTIC FEEDBACK", and now issued as U.S. Pat. No. 10,817,063. The entireties of the aforementioned applications are hereby incorporated herein by reference.

TECHNICAL FIELD

This application relates to techniques facilitating interaction with a vehicle touchscreen using haptic feedback to facilitate selection of graphical touch controls displayed on the touchscreen.

BACKGROUND

The rapid increase in smartphone and tablet use in recent years has users accustomed to interacting with their electronic devices by a simple swipe or touch of the finger. As a result, automobile manufacturers are turning to touchscreen technology for a variety of applications. For example, the center stacks of many automobile dashboards are being implemented with touchscreens that provide graphical touch controls to control virtually everything in the vehicle, including the infotainment systems, the heating, ventilation, and air conditioning (HVAC) controls, the navigation system, the backup camera and other settings. In this regard, many automobiles are moving away from electromechanical buttons and knobs to having functionality and advanced applications that are accessed and controlled via touchscreens.

A major concern with replacing mechanical controls with touchscreens is the issue of driver distraction. Drivers are used to interacting with electromechanical controls, and can often locate them by feel, without the need to avert their eyes for a significant amount of time. In addition, the traditional controls provide some type of tactile feedback, such as a click when a knob is rotated, or a button is pushed. Touchscreens, with a lack of physical differentiation from one spot on the screen to another, are more likely to require users to look at the screen to see what they are pressing than with traditional buttons and dials. As a result, drivers may be inclined to avert their eyes from the road more frequently, and possibly for longer periods of time.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, systems, computer-implemented methods, apparatus and/or computer program products are presented that facilitate safely interacting with a touchscreen of a vehicle while driving the vehicle using haptic feedback.

According to one or more embodiments, a system is provided that facilitates interfacing with a touchscreen of a vehicle, the system comprising a processor that executes computer executable components stored in at least one memory. The computer executable component can include a display control component that selects one or more graphical touch controls to include in a graphical user interface (GUI) to render on the touchscreen based on activation of a haptic feedback mode that interfaces with the touchscreen, wherein the one or more graphical touch controls correspond to controls for one or more applications or functions associated with the vehicle. The computer executable component can also include a positioning component that determines a location of a finger on or over the touchscreen relative to the one or more graphical touch controls as displayed on the touchscreen, and a haptic feedback component that causes a vibration unit of the vehicle to provide vibration feedback based on the location corresponding to a graphical touch control of the one or more graphical touch controls.

In one or more implementations, the system further provides a visual mode for interfacing with the vehicle touchscreen and wherein based on the activation of the haptic feedback mode, the display control component adapts a first configuration of the GUI as configured for display in accordance with the visual mode to a second configuration as configured for display in accordance with the haptic feedback mode, wherein the second configuration includes the one or more graphical touch controls. For example, the second configuration can differs from the first configuration with respect to one or more elements of the GUI selected from a group consisting of: an application or function of the vehicle represented by a graphical touch control of the one or more graphical controls, a number of the one or more graphical touch controls, a size of the one or more graphical touch controls, and an arrangement of the one or more graphical touch controls.

In some embodiments, the system can further include an activation component that activates the haptic feedback mode based on a context of the vehicle. The context of the vehicle can be based on one or more contextual factors selected from a group consisting of: a mobility state of the vehicle, a driving mode of the vehicle, a location of the vehicle, a current level of traffic, a current weather condition, a location of the vehicle, and a route of the vehicle.

In addition to selection of the one or more graphical touch controls to include the GUI based on activation of the haptic feedback mode, the display control component can further select the one or more graphical touch controls based on a preference of a driver of the vehicle regarding a preferred application or a preferred function of the vehicle for use in the haptic feedback mode. With these embodiments, the system can include a machine learning component that employs machine learning and artificial intelligence to learn the preference of the driver based on historical usage information regarding historical interaction with the touchscreen by the user. In some implementations, the display control component can further determine a number of the one or more graphical touch controls for including in the GUI based on the activation of the haptic feedback mode. The display control component can also determine at least one of, an arrangement of the one or more graphical touch controls, or a size of the one or more graphical touch controls based on the activation of the haptic feedback mode.

The display control component can further select the one or more graphical touch controls based on a context of the vehicle in association with the activation of the haptic feedback mode. The context of the vehicle can be based on one or more contextual factors selected from a group consisting of: a mobility state of the vehicle, a driving mode of the vehicle, a location of the vehicle, a current level of traffic, a current weather condition, a location of the vehicle, and a route of the vehicle. With these embodiments, the system can also include a machine learning component that employs machine learning and artificial intelligence to determine relevance of respective applications and functions of a plurality of applications and functions of the vehicle to the context of the vehicle, and wherein the display control component further selects the one or more graphical touch controls based on a determination that the one or more applications or functions are more relevant to the context relative to other applications or functions of the plurality of applications and functions.

In some embodiments, elements described in connection with the disclosed systems can be embodied in different forms such as a computer-implemented method, a computer program product, or another form.

DESCRIPTION OF THE DRAWINGS

FIGS. 4A and 4B illustrate example haptic feedback functionality that facilitates selecting graphical elements displayed on a vehicle touchscreen in accordance with one or more embodiments of the disclosed subject matter.

DETAILED DESCRIPTION

Figure 1:
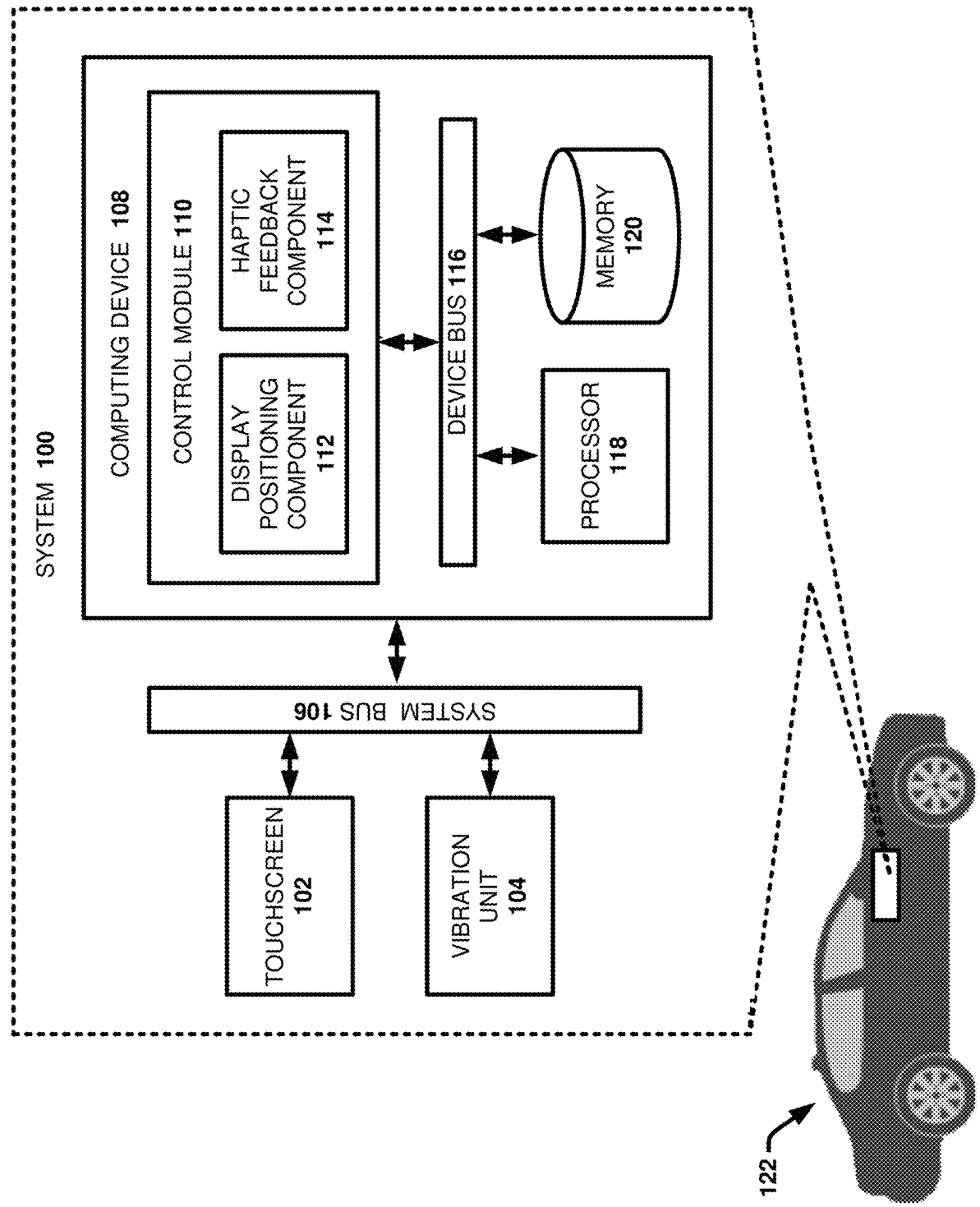
FIG. 1 illustrates a block diagram of an example, non-limiting system that facilitates interacting with a touchscreen of a vehicle using haptic feedback in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed to using haptic feedback to refine and improve interaction with vehicle touchscreen controls, thereby reducing driver distraction. In one or more embodiments, to avoid forcing the driver to look away from the road while interacting with the touchscreen, vibration feedback can be integrated into the touchscreen, the steering wheel, and/or the driver's seat to indicate when the driver is aiming at a graphical touch control. For example, in association with moving a finger over a vehicle touchscreen displaying a GUI with graphical touch controls corresponding to vehicle function controls and/or applications, the position of the finger relative to a graphical touch control can be communicated to the user via a vibration of the screen, the steering wheel, and/or the driver's seat. In this regard, when a finger is detected to be hovering over or lightly touching a graphical touch control displayed on the touchscreen, the screen, steering wheel, and/or the driver's seat, can vibrate. The driver can therefore feel a vibration when the finger passes over or stops on a graphical touch control corresponding to a control for a vehicle function or an application, making it possible to aim and select a function or application without looking away from the road.

In some embodiments, different types of vibrations and/or vibration patterns can be used to distinguish between different graphical elements and/or corresponding functions/controls. For example, a first vibration pattern can be used to indicate when the driver is aiming at a graphical element for an HVAC control and a second vibration pattern can be used to indicate when the driver is aiming at a graphical element corresponding to a radio control. With these embodiments, the driver can learn the specific vibration patterns that correspond to respective touchscreen control functions or applications to know what specific control function or application the driver is aiming at without looking at the screen. Different types of vibrations and/or vibration patterns can also be used to distinguish between and/or identify different graphical pages or screens of the GUI. For example, a first vibration type/pattern can be used to identify a primary or home screen, a second vibration type/pattern can be used to identify a second page that is accessed by swiping left on the home screen, a third vibration type/pattern can be used to identify a third page that is accessed by swiping right on the home screen, and so on.

In other embodiments, the driver can learn the layout of the GUI, including the layout and arrangement of different graphical elements of respective graphical pages of the GUI. For example, a primary page or home screen of the GUI displayed on the touchscreen can include a defined number of graphical elements arranged in grid fashion. According to this example, the driver can learn the arrangement of the graphical elements in the grid and count the number of vibrations felt as the driver moves a finger over the touchscreen to determine which graphical element (and corresponding function or application) the finger is aiming at. For example, starting from the upper left-hand corner of the touchscreen, the driver can count two positions right and three positions down by feeling the vibrations as the driver moves a finger over the respective positions. The driver can thus determine, based on the counted vibrations, where the finger is located on the GUI grid and select the known graphical element at the desired grid location.

In one or more embodiments, the haptic feedback functionality for interacting with a vehicle touchscreen can be enabled and disabled based on driver discretion and/or automatically based on context of vehicle operation. In this regard, the vehicle touchscreen can be operated in at least two modes including a haptic feedback mode wherein haptic feedback (e.g., vibrational feedback) is provided in association with interfacing with the touchscreen, and a visual mode, wherein haptic feedback is not provided. In some implementations, a user can select a desired mode (e.g., either the haptic feedback mode, the visual mode, or another mode) for interfacing with the vehicle touchscreen based on the user's discretion. In other implementations, the haptic feedback mode can be automatically activated based on a context of the vehicle and/or the user operating the vehicle touchscreen. For example, in some implementations, the haptic feedback mode can be automatically activated based on a mobility state of the vehicle, such as when the vehicle is in motion or otherwise in active driving state (e.g., not in park). In another example, the haptic feedback mode can be automatically activated/deactivated based on whether the touchscreen is being operated by the driver or a passenger.

The haptic feedback mode can also vary from the visual mode with respect to the layout or arrangement of the GUI. For example, the specific graphical elements that are displayed, the number of graphical elements displayed, the size of the graphical elements, the arrangement/order of the graphical elements, and the like can be adapted in the haptic feedback mode to facilitate tactile interaction as opposed to visual interaction with the touchscreen. For instance, when the vehicle is parked and the driver can safely look at the touchscreen to interface with the GUI, the GUI can include a greater number of graphical elements, more detailed controls, applications that require more precise user input/interaction, and the like. On the contrary, when vehicle is in an active driving state and the haptic feedback mode is activated, the GUI can include a fewer number of graphical elements, larger graphical elements, graphical elements for only the most relevant controls/applications used during driving, etc., to facilitate easier selection of the graphical elements based on tactile feedback without looking at the touchscreen.

The haptic feedback mode can also be tailored/adapted based on individual user preferences and/or context of the vehicle. For example, the specific functions and/or applications for which graphical elements are displayed in haptic feedback mode, the number of graphical elements displayed, the size of the graphical elements, the arrangement/order of the graphical elements, the type of vibration feedback provided, and the like can be tailored based on individual user preferences and/or context. In some embodiments, these features of the haptic feedback mode can be selected/configured by a user. For example, a particular driver can select the specific functions/applications for which graphical elements are displayed on the home screen, the order and arrangement of the graphical elements, the type of vibration feedback used to identify the respective functions/application, and the like. In other embodiments, machine learning and artificial intelligence can be employed to learn user preferences and behaviors regarding what functions/applications are accessed, how they are accessed, patterns associated with finger movements relative to the touchscreen and the like, in association with various operating contexts (e.g., driving mode or mobility state, speed, location, route, time of day, traffic levels, weather, number and identity of other passengers in the vehicle, etc.). Based on these learned preferences/behaviors/patterns, the feature and functionalities of the haptic feedback mode can be automatically adapted to optimize user interaction.

Various embodiments of the disclosed subject matter are described with reference to a touchscreen of an automobile (or car). However, the disclosed techniques are not limited to automobiles can be adapted to facilitate interacting with touchscreens used in various types of vehicles and modes of transportation (e.g., a truck, a bus, a train, an airplane, a boat, etc.). The disclosed techniques can also be applied to facilitate interfacing with touchscreens in other domains, (e.g., other than motor vehicles), that involve performance of a task which requires visual focus on something other than the touchscreen. In addition, although various embodiments are directed to facilitating tactile interaction between a vehicle touchscreen and a driver of the vehicle, it should be appreciated that haptic feedback can be used to facilitate interaction between a vehicle touchscreen and other users (e.g., passengers).

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates interacting with a touchscreen of a vehicle using haptic feedback in accordance with one or more embodiments of the disclosed subject matter. In accordance with various exemplary embodiments, system 100 (and other systems described herein) can be deployed on or within a vehicle, such as an automobile 122, to facilitate safely interfacing with a touchscreen of the vehicle while driving the vehicle.

System 100 can include a touchscreen 102, a vibration unit 104, and a computing device 108. The touchscreen 102 can display one or more interactive GUIs that facilitate accessing and/or controlling various functions and/or applications. In this regard, the GUIs can present one or more graphical touch controls that can respectively correspond to a control for a function of the vehicle, an application, a function of the application, interactive data, a hyperlink to data, and the like, wherein selection and/or interaction with the graphical touch control as displayed on the touchscreen 102 via touch activates the corresponding functionality. For example, one or more GUIs displayed on the touchscreen 102 can include selectable graphical elements, such as buttons or bars corresponding to a vehicle navigation application, a media application, a phone application, a back-up camera function, a car settings function, a parking assist function, and the like. In some implementations, selection of a button or bar corresponding to an application or function can result in the generation of a new window or GUI comprising additional selectable icons or widgets associated with the selected application. For example, selection of the media application can result in generation of a new GUI or window that includes additional buttons or widgets for different media sources (e.g., radio, a streaming music system, music from an auxiliary input device or phone, etc.), different radio stations, volume controls, and the like. The type and appearance of the graphical touch controls can vary. For example, the graphical touch controls can include icons, symbols, widgets, windows, tabs, text, images, and the like In this regard, the touchscreen 102 can comprise a computer display screen (e.g., for computing device 108) that also serves as an input device. The touchscreen 102 can comprise suitable hardware that registers input events in response to touch (e.g., by a finger, stylus, gloved hand, pen, etc.). In some implementations, the touchscreen 102 can detect the position of an object (e.g., by a finger, stylus, gloved hand, pen, etc.) over the touchscreen 102 within close proximity (e.g., a few centimeters) to touchscreen without the object touching the screen. As used herein, unless otherwise specified, reference to "on the touchscreen" refers to contact between an object (e.g., a user's finger) and the touchscreen 102 while reference to "over the touchscreen" refers to positioning of an object within close proximity to the touchscreen (e.g., a defined distance away from the touchscreen) yet not contacting the touchscreen.

The type of the touchscreen 102 can vary and can include but is not limited to, a resistive touchscreen, a surface capacitive touchscreen, a projected capacitive touchscreen, a surface acoustic wave touchscreen, and an infrared touchscreen. In various embodiments, the touchscreen 102 can be positioned on the dashboard of the vehicle, such as on or within the center stack or center console of the dashboard. However, the position of the touchscreen 102 within the automobile 122 can vary.

Figure 2:
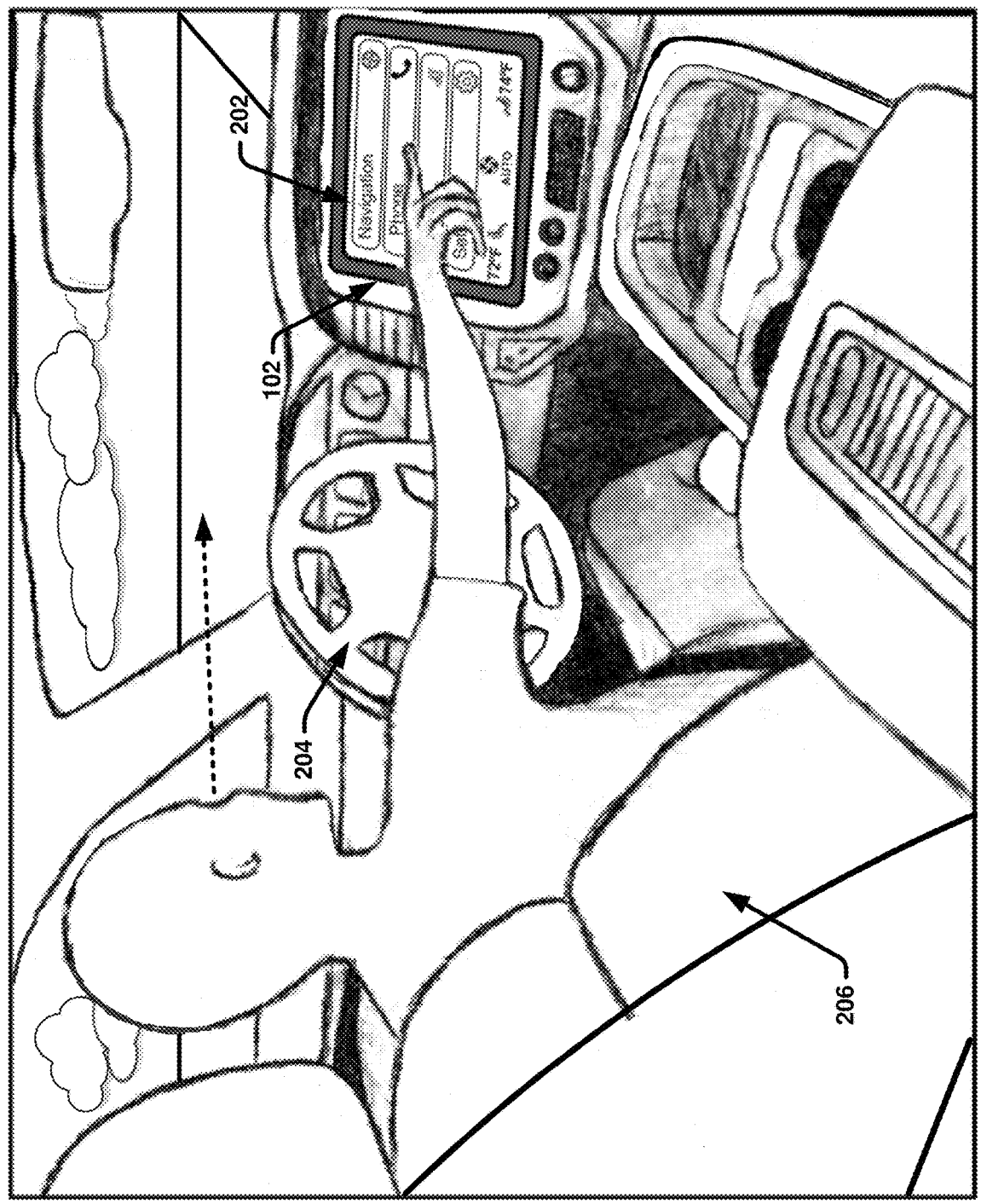
FIG. 2 presents an example illustration of a driver operating a vehicle and interacting with a touchscreen of the vehicle in accordance with one or more embodiments of the disclosed subject matter.

FIG. 2 presents an example illustration of a driver operating a vehicle and interacting with a touchscreen 102 of the vehicle in accordance with one or more embodiments of the disclosed subject matter. In the embodiment shown, the touchscreen 102 is positioned on the center stack of the vehicle dashboard. The touchscreen 102 is displaying a GUI 202 with various graphical touch controls.

Figure 3:
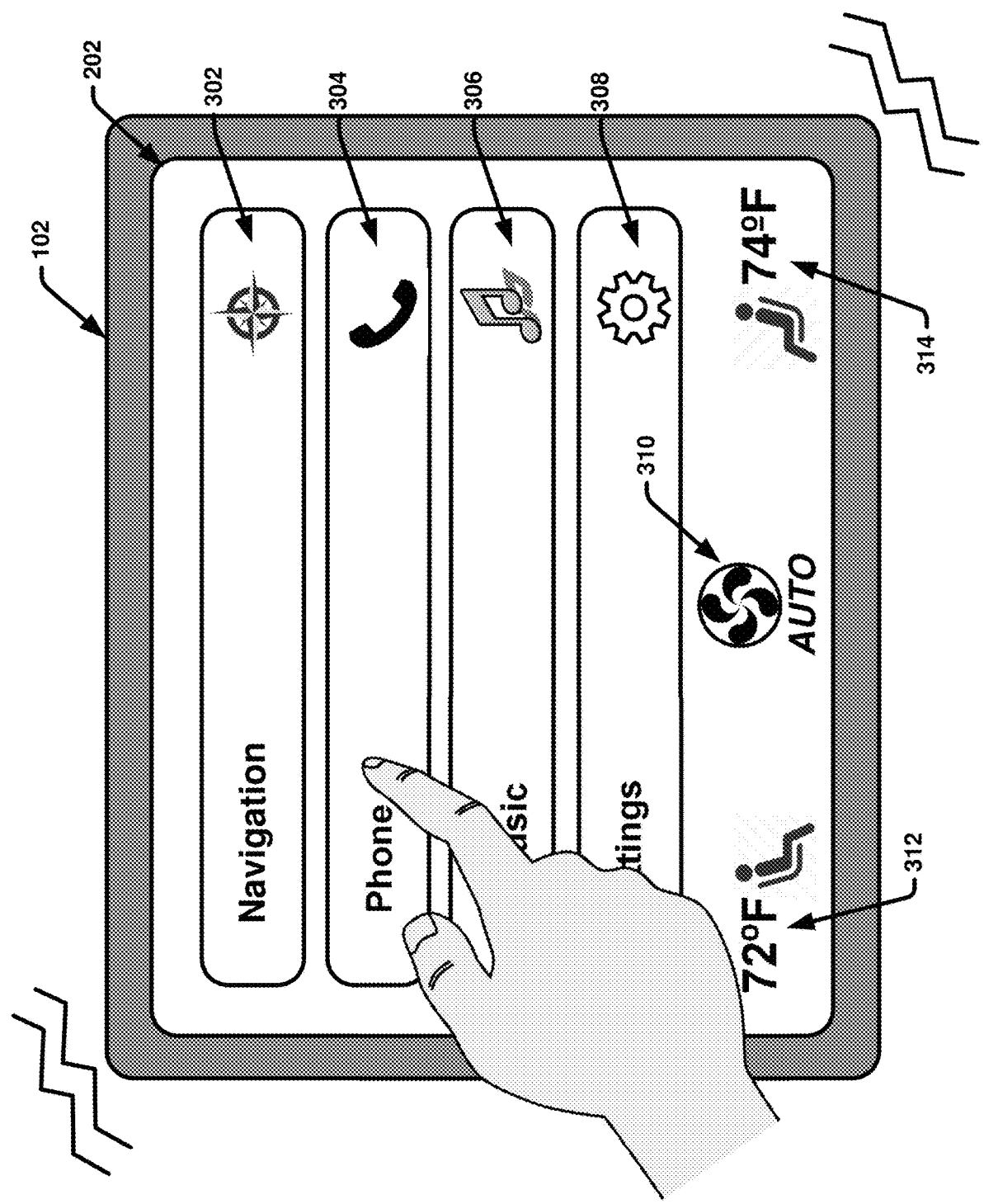
FIG. 3 presents an illustration of an example graphical user interface (GUI) that can be displayed on a vehicle touchscreen in accordance with one or more embodiments of the disclosed subject matter.

FIG. 3 presents an enlarged view of GUI 202. With reference to FIG. 2 and FIG. 3, the example GUI 202 comprises four graphical touch controls respectively represented by selectable buttons or bars. The selectable buttons comprise text and icons to indicate the function or application they represent. For example, bar 302 corresponds to a navigation application, bar 304 corresponds to a phone application, bar 306 corresponds to a music application, and bar 308 corresponds to a settings function. The specific applications/functions represented in GUI 202 are merely exemplary and can vary. In accordance with this example implementation, the applications/functions can be selected/activated by touching or tapping anywhere within the defined area of the corresponding bar. For example, in this example implementation, the driver is pointing to and/or touching the bar 304 corresponding to the phone application. GUI 202 also includes interactive controls for the HVAC system of the vehicle. For example, control 312 corresponds to a control for the left-side HVAC unit of the vehicle and control 314 corresponds to a control for a right-side HVAC unit of the vehicle. In accordance with this example, control 312 and control 314 can be selected by touching or tapping the associated text and/or seat icon. In some implementations, based on selection of either control 312 or control 314, additional graphical elements (e.g., widgets) can be displayed on the touchscreen (e.g., in a new GUI page, as an overlay, in a new window, etc.) that can be interacted with to change the temperature of the corresponding HVAC unit. GUI 202 also includes a main HVAC control 310 that can be selected by touching or tapping the fan icon to change and control the HVAC mode of the vehicle.

With reference again to FIG. 1, the vibration unit 104 can comprise vibration hardware that causes or generates a vibration when driven by an electric circuit. For example, the vibration unit 104 can comprise one or more vibration motors, linear resonant actuators, and the like. With reference to FIG. 1 and FIG. 2, in some embodiments, the vibration unit 104 can be physically coupled to the touchscreen 102 to cause the touchscreen 102 and/or specific positions on the touchscreen to vibrate (as controlled by the computing device). For example, the vibration unit 104 can comprise one or more vibrating motors and/or actuators located with the dashboard of the vehicle behind the touchscreen 102. In another example, the vibration unit 104 can be integrated within the back panel of the touchscreen 102. In other embodiments, the vibration unit 104 can be physically coupled to the steering wheel 204 of the vehicle to cause the steering wheel or a specific area of the steering wheel to vibrate. For example, the vibration unit 104 can comprise one or more vibrating motors and/or actuators located at one or more positions within the outer rim of the steering wheel 204. In another embodiment, the vibration unit 104 can be physically coupled to one or more seats of the vehicle to cause the one or more seats to vibrate. For example, the vibration unit 104 can comprise one or more vibrating motors and/or actuators located within the backrest of the driver's seat 206 and/or within the seat portion of the driver's seat 206. Still in other embodiments, the vibration unit 104 can integrate vibrating hardware (e.g., motors or actuators) into some or all of these elements (e.g., the touchscreen 102, the steering wheel 204, the driver's seat 206, and passenger seats).

The touchscreen 102 and the vibration unit 104 can be operatively coupled to the computing device 108 via a system bus 106. The computing device 108 can facilitate executing and controlling one or more operations of the vehicle, including one or more operations of the touchscreen 102 and the vibration unit 104. In this regard, embodiments of system 100 and other systems described herein can include one or more machine-executable components embodied within one or more machines (e.g., embodied in one or more computer readable storage media associated with one or more machines). Such components, when executed by the one or more machines (e.g., processors, computers, computing devices, virtual machines, etc.) can cause the one or more machines to perform the operations described.

For example, in accordance with system 100, the computing device 108 includes a control module 110 that further includes a display positioning component 112 and a haptic feedback component 114. These components can respectively correspond to machine-executable components. The computing device 108 can further include or be operatively coupled to at least one memory 120 and at least one processor 118. In various embodiments, the at least one memory 120 can store executable instructions (e.g., the control module 110, the display positioning component 112, and the haptic feedback component 114) that when executed by the at least one processor 118, facilitate performance of operations defined by the executable instruction. The computing device 108 can further include a device bus 116 that communicatively couples the various components of the computing device 108 (e.g., the control module 110, the display positioning component 112, the haptic feedback component 114, the processor 118 and the memory 120).

The control module 110 can control various operations and systems of the automobile 122, including at least operations of the touchscreen 102 using the display positioning component 112 and operations of the vibration unit 104 using the haptic feedback component 114.

The display positioning component 112 can monitor and determine a location of a finger, stylus, or other object, relative to the touchscreen 102, and more particularly relative to one or more graphical touch controls displayed on the touchscreen 102. In this regard, the display positioning component 112 can receive input from the touchscreen 102 indicating the location of a user's finger (or another object operated by the user to interact with the touchscreen 102) on or over the touchscreen. Based on the position and arrangement of the one or more graphical touch controls of the GUI displayed on the touchscreen and the location of the finger (or other object) on or over the touchscreen, the display positioning component 112 can further determine the position of the finger (or other object) relative to the one or more graphical touch controls. Thus, the display positioning component 112 can determine when a user is touching, pointing to, or otherwise aiming at graphical touch control displayed on the GUI. For example, with reference to FIG. 2 and FIG. 3, the display positioning component 112 can determine that the driver is pointing to and/or touching the bar on the GUI 202 that corresponds to the phone application (e.g., bar 304).

The haptic feedback component 114 can control provision of haptic feedback to a user interfacing with the touchscreen 102 in association with interaction with the GUI displayed on the touchscreen 102. In various embodiments, the haptic feedback can be in the form of a vibration or vibration pattern generated by the vibration unit 104. In this regard, the haptic feedback component 114 can control the vibration unit 104 to cause the vibration unit 104 to generate the vibration feedback based at least in part on the location or position of the user's finger (or another object) relative to graphical touch controls displayed on the touchscreen. For example, based on detection of a position of a user's finger (or other object) being on or over a graphical touch control of the GUI, the haptic feedback component 114 can direct or otherwise cause the vibration unit 104 to generate vibration feedback. Depending on the location or locations of the vibration unit 104, the vibration feedback can include vibration of the touchscreen 102 itself, vibration of the steering wheel 204, and/or vibration of the driver's seat 206. For example, with reference to FIG. 2 and FIG. 3, in the embodiment shown, the driver's finger is located on or over the selectable bar corresponding to the phone application (e.g., bar 304). In accordance with this example embodiment, based on the finger being located on or over bar 304, the touchscreen 102, the steering wheel 204, and/or the driver's seat 206 can vibrate (e.g., as indicated by the dashed lines shown in FIG. 3) to indicate to the driver that the driver is aiming at a graphical touch control. Accordingly, a user (e.g., the driver) can find and know when they are aiming at a graphical touch control based by feeling the vibration feedback, thus enabling the driver to maintain visual focus on the road as opposed to the display.

FIGS. 4A and 4B further illustrate this haptic feedback functionality in accordance with one or more embodiments of the disclosed subject matter. In this regard, FIGS. 4A and 4B respectively demonstrate an example implementation of when vibration feedback can be generated in association with user interaction with GUI 202. Repetitive description of like elements employed in respective embodiments is omitted for sake of brevity.

In FIG. 4A, the user's finger is located in an area of the GUI 202 that does not include a graphical touch control. Accordingly, no vibration feedback is generated when the user's finger is in this position. However, when the user moves their finger on or over control 312 as shown in FIG. 4B, vibration feedback can be generated to indicate to the user that the user is aiming at a graphical touch control, which is in this example control 312.

In some implementations, the haptic feedback component 114 can cause the vibration unit 104 to provide the vibration feedback in response to movement or passage of a finger (or other object) on or over and then stopping on or over a graphical touch control. In another implementation, the haptic feedback component 114 can cause the vibration unit 104 to provide the vibration feedback based on movement or passage of a finger (or other object) over the graphical touch controls. For example, as the user moves a finger over the touchscreen or drags the finger on the touchscreen (while maintaining contact with the touchscreen), the haptic feedback component 114 can cause the vibration unit 104 to vibrate to indicate when the finger moves on or over a graphical touch control. For example, in some implementations, the haptic feedback component 114 can cause the vibration unit 104 to generate a vibration when the finger (or other object) moves on or over the graphical touch control and maintain the vibration until the finger move off of the graphical touch control (e.g., when the finger is no longer positioned on or over the graphical touch control).

In one or more additional implementations, the haptic feedback component 114 can cause the vibration unit 104 to generate a short vibration when the finger (or another object) moves on or over the graphical touch control. The user can then use the short vibration as a signal to indicate where the graphical touch control is located on the touchscreen and stop the movement of the finger to select the corresponding graphical element. With this implementation, if the user's finger passes over and then off of the graphical element, the user can move their finger back to the spot where the last vibration was felt to find and select the graphical touch control. When the user moves their finger back over or on the graphical touch control, another short vibration can be generated. In this regard, each time the finger moves over a graphical touch control, a short vibration pulse can be generated and then the vibration can cease, even if the finger remains located on or over a graphical touch control. Likewise, after the finger moves away from a graphical touch control and onto a different graphical touch control or back onto the same graphical touch control, a short vibration pulse can be generated.

In some embodiments, the haptic feedback component 114 can also control provision of vibration feedback to the user based on specific gestures or motions performed in association with interacting with the touchscreen 102. For example, in some implementations, different motions or gestures applied to the touchscreen 102 such a tapping once, tapping twice, pressing and holding, swiping, and the like can correspond to different input commands that can result in different actions. For example, swiping left on the touchscreen can correspond to a request to change the displayed GUI page to the next sequential page to the right, pressing and holding down on the touchscreen can correspond to a command to deactivate a running application, tapping twice on a graphical element can correspond to selection of the graphical element, and so on. With these implementations, the haptic feedback component 114 can also control provision of vibration feedback based on detection (e.g., by the display positioning component 112) of such gestures or motions that correspond to defined input commands. For example, in response to swiping the touchscreen 102, the haptic feedback component 114 can cause the vibration unit 104 to generate vibration feedback to indicate the input command was detected and the corresponding action was executed.

Figure 5B:
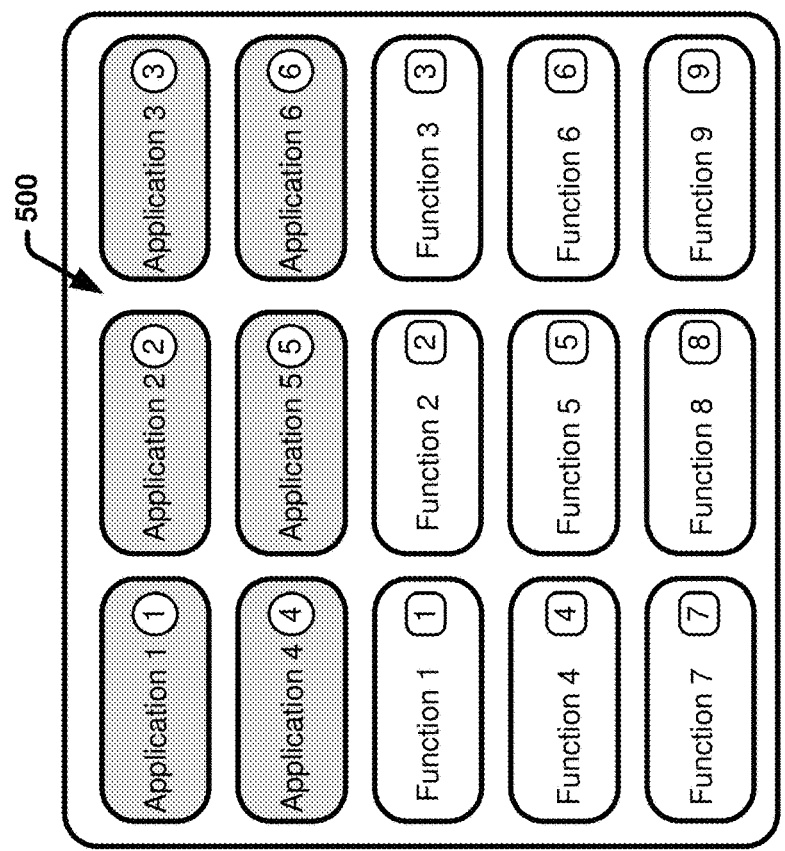
FIGS. 5A and 5B illustrate a mechanism for transitioning between graphical pages of a GUI displayed on a vehicle touchscreen in accordance with one or more embodiments of the disclosed subject matter.
Figure 5A:
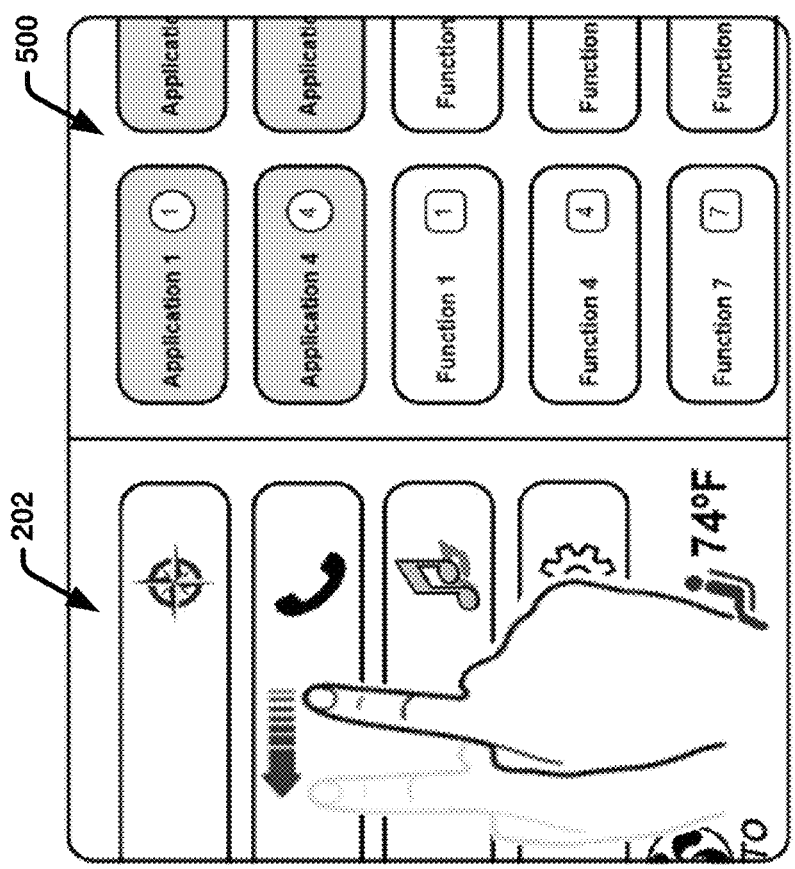

For example, FIGS. 5A and 5B illustrate a mechanism for transitioning between graphical pages of a GUI displayed on a vehicle touchscreen in accordance with one or more embodiments of the disclosed subject matter. Repetitive description of like elements employed in respective embodiments is omitted for sake of brevity. FIG. 5A presents a snapshot view of a transition between displaying GUI 202 and GUI 500. FIG. 5B presents the GUI 500 in its entirety. In the embodiment shown, GUI 500 corresponds to a second example GUI page that is located "to the right" of GUI 202. In accordance with this example, GUI 500 can be accessed and displayed in response to swiping left on GUI 202, as shown in FIG. 5A. Based on detection of the swiping left gesture and the subsequent rendering or initiation of rendering GUI 500, the haptic feedback component 114 can cause the vibration unit 104 to generate a vibration that corresponds to a signal indicating that next GUI page (e.g., the selected page to the right of GUI 202) has been displayed. Accordingly, a user (e.g., the driver) can access different GUI pages and know when a new page has been displayed by feeling the vibration feedback in association and/or in response to performance of an input command using the touchscreen 102, thus enabling the driver to maintain visual focus on the road when interfacing with the touchscreen 102.

In one or more embodiments, different types of vibration feedback and/or vibration patterns can be employed to distinguish between and/or identify different graphical elements and their corresponding functions/applications. For example, with reference to GUI 202, a first type or pattern of vibration feedback can be generated based on positioning of the user's finger over the navigation element (bar 302), a second type or pattern of vibration feedback can be generated based on positioning of the user's finger over the phone element (bar 304), a third type or pattern of vibration feedback can be generated based on positioning of the user's finger of the music element (bar 306), and so on. For example, different types and/or patters of vibration feedback can be generated by varying the vibration strength, frequency, duration, number of vibration pulses, pulse patterns, source of the vibration (e.g., the touchscreen 102, the steering wheel 204 and/or the driver's seat 206), and the like. Different types of vibration feedback and/or vibration patterns can also be employed to distinguish between and/or different GUI pages, different input commands and/or resulting responses, different types of graphical touch controls (e.g., wherein the different types of graphical touch controls vary based on how they can be interacted with), and the like.

In accordance with these embodiments, the haptic feedback component 114 can control the manner and nature of the vibrations generated by the vibration unit 104 to generate the different types of vibrations and/or the different vibration patterns that are used to distinguish between and/or identify different things (e.g., different graphical elements and their corresponding functions/applications, different GUI pages, different input commands, etc.). With these embodiments, the user can learn what types of vibrations and/or vibration patterns correspond to specific graphical touch controls (and their corresponding functions/applications), specific GUI pages, specific input commands and the like over time. In this regard, a unique tactile (e.g., vibration-based) mode of communication can be developed and learned to accurately and effectively interface with the touchscreen 102 without looking at the touchscreen.

In other embodiments, the driver can learn the layout of the GUI, including the layout and arrangement of different graphical elements of respective graphical pages of the GUI. For example, in accordance with GUI 202 and GUI 500, most or all of the graphical touch controls are arranged in a grid like fashion. For example, GUI 202 comprises four buttons or bars arranged in a stacked grid-like configuration. GUI 500 comprises fifteen graphical touch controls respectively arranged into a grid comprising three columns and five rows. In accordance with these example GUI configurations, the driver can learn the arrangement of the graphical elements in the grid for each GUI page (e.g., GUI 202, GUI 500 and so one), and count the number of vibrations felt as the driver moves a finger over the touchscreen to determine which graphical element (and corresponding function or application) the finger is aiming at. For example, with reference to GUI 500, assume the user (e.g., the driver) knows the arrangement (and corresponding application or function) of the graphical touch controls of GUI 500. In this case, if the user wants to access "function 5," starting from the upper left-hand corner of GUI 500, the driver can move their finger over the touchscreen and count two positions right and three positions down to land on function 5 by feeling the vibrations as the driver moves a finger over the respective positions. The driver can thus determine, based on the counted vibrations, where the finger is located on the GUI grid and select the known graphical element at the desired grid location.

Figure 6:
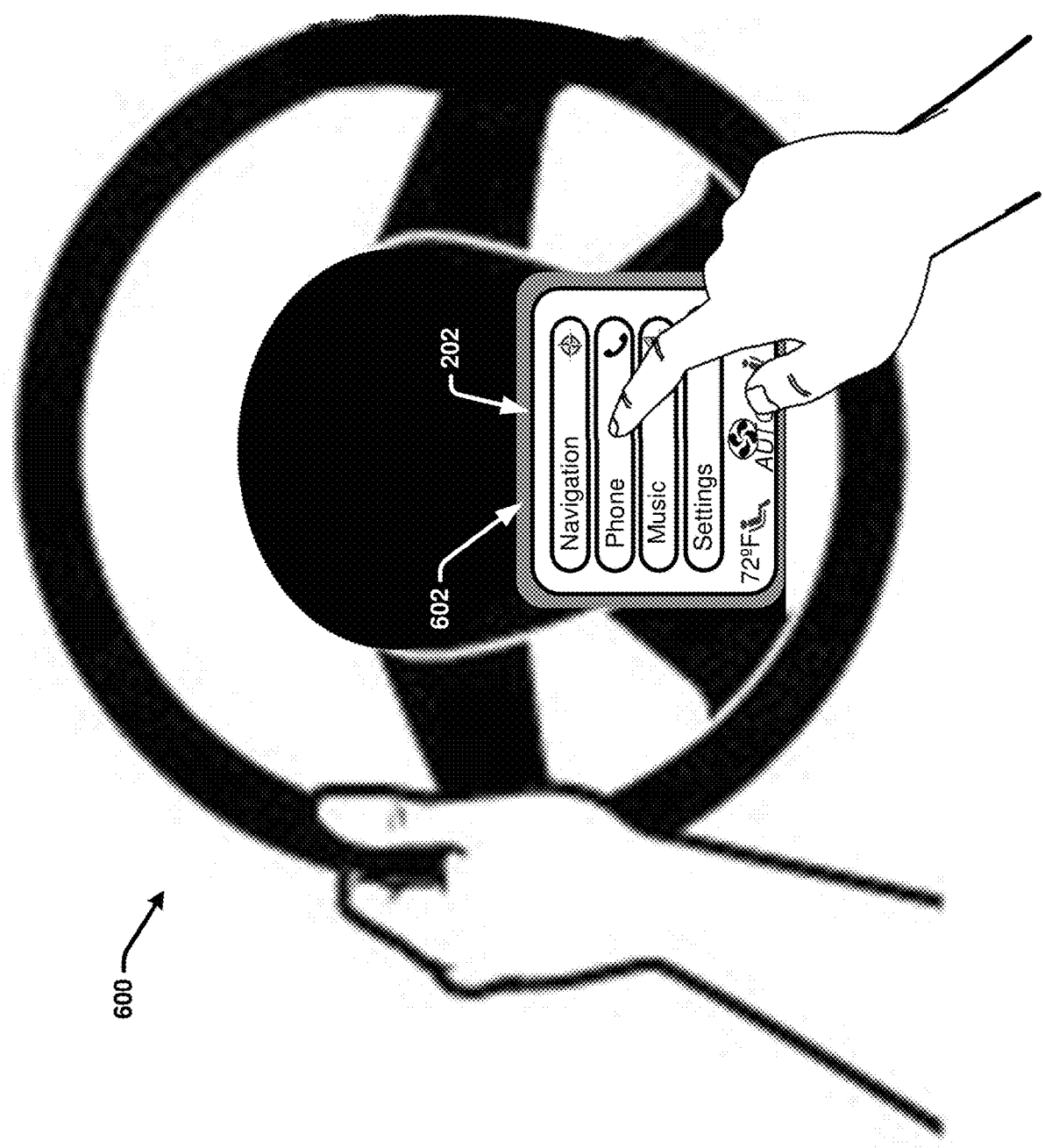
FIG. 6 presents an example illustration of a vehicle steering wheel with an integrated touchscreen in accordance with one or more embodiments of the disclosed subject matter.

FIG. 6 presents an example illustration of a vehicle steering wheel 600 with a touchscreen 602 integrated onto the vehicle steering wheel 600 in accordance with one or more embodiments of the disclosed subject matter. Touchscreen 602 can provide same or similar features and functionalities as touchscreen 102. In this regard, touchscreen 602 correspond to touchscreen 102 and be operatively and communicatively coupled to the computing device 108 (and in some implementations the vibration unit 104) to provide the same or similar haptic feedback techniques discussed herein with respect to touchscreen 102. Repetitive description of like elements employed in respective embodiments is omitted for sake of brevity.

In accordance with this example embodiment, in addition to or alternative to placing the touchscreen 102 on the center stack of the vehicle dashboard, a touchscreen 602 can be integrated onto the vehicle steering wheel 600. The size of the touchscreen 602 and the manner in which the touchscreen 602 is integrated onto the vehicle steering wheel 600 can be tailored to facilitate efficient access by the driver without impeding the area of the steering wheel from which the air bag is deployed. For example, in some implementations, the touchscreen 602 can have a size and shape that is smaller than the touchscreen 102 integrated into the center stack.

In some embodiments in which the vehicle includes both touchscreen 102 in the center stack and touchscreen 602 on the vehicle steering wheel 600, touchscreen 102 can serve as a primary touchscreen while touchscreen 602 can serve as a secondary touchscreen. With these embodiments, in some example implantations, the GUI displayed on touchscreen 602 can mirror that displayed on touchscreen 102. In other implementations, the GUI displayed on touchscreen 602 can include a different GUI that is specifically tailored to facilitate haptic feedback interaction in accordance with the techniques described herein. For example, the touchscreen 602 on the steering wheel can provide a GUI that is consistent with a haptic feedback mode for interfacing with the vehicle controls while the touchscreen 102 on the center stack can display the normal or standard GUI (e.g., the GUI used for the visual mode). (The haptic feedback mode and the visual mode are discussed in greater detail infra). In other implementations, when the touchscreen 602 is activated and displaying a GUI consistent with the haptic feedback mode, the primary touchscreen on the dashboard (e.g., touchscreen 102) can be dimmed or turned off to minimize distraction to the driver.

Figure 7:
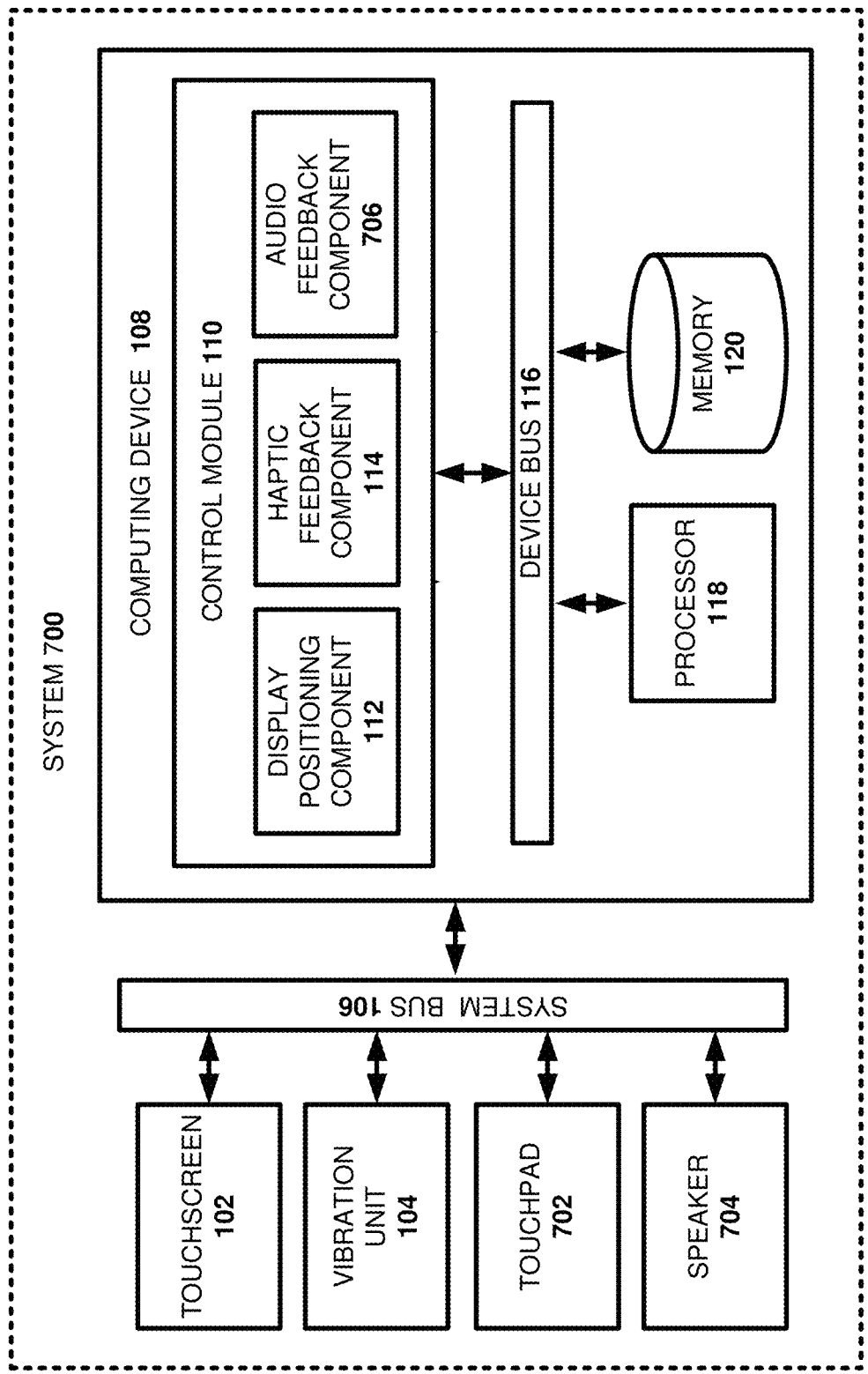
FIG. 7 illustrates a block diagram of another example, non-limiting system that facilitates interacting with a touchscreen of a vehicle using haptic feedback in accordance with one or more embodiments of the disclosed subject matter.

FIG. 7 illustrates a block diagram of another example, non-limiting system 700 that facilitates interacting with a touchscreen of a vehicle using haptic feedback in accordance with one or more embodiments of the disclosed subject matter. System 700 includes same or similar features and functionalities as system 100 with the addition of a touchpad 702, a speaker 704, and an audio feedback component 706. In this regard, like system 100, system 700 can also be deployed on or within a vehicle (e.g., automobile 122) or suitable another environment. Repetitive description of like elements employed in respective embodiments is omitted for sake of brevity.

In some embodiments, audio feedback can be used in conjunction with haptic feedback to further enhance a user's ability to interface with a touchscreen 102 (and/or touchscreen 602) without looking at the touchscreen. For example, the audio feedback can include sounds such as beeps, clicks, pops, ticks, buzzing, etc., that can be used to identify or indicate when a user is pointing at or touching a graphical touch control on the touchscreen 102. In some implementations, different sounds can also be used to differentiate between and/or identify different graphical elements (e.g., and their corresponding applications or functions), different GUI pages, different input commands and corresponding actions, and the like. In some implementations, the audio feedback can include spoken words or phrases. For example, spoken words or phrases can be used to identify a specific application or function that a user is aiming at (e.g., by stating "phone," "navigation," etc.), to identify or describe the layout of a displayed GUI (e.g., naming the functions and/or actions represented on the displayed page), and the like. With these embodiments, the control module 110 can include audio feedback component 706 to control generation and provision of audio feedback to a user based on their interaction with the touchscreen 102.

For example, the audio feedback component 706 can direct or cause a speaker 704 of the system 700 to emit a specific sound, word or phrase based on where the user's finger is aiming relative to a graphical touch control, based on input commands detected, based on the specific GUI page that is displayed and the like.

System 700 can further include a touchpad 702. The touchpad 702 can provide same or similar features and functionalities of conventional touchpads for interfacing with computing devices, such as those included in many laptop computers. For example, the touchpad 702 (also referred to as trackpad) can be or correspond to an input device with one or more tactile sensors and a specialized surface that can translate the motion and position of a user's finger (or fingers) on the touchpad relative to a position of a GUI for an operating system that is displayed. Actions performed on the touchpad 702 such as tapping the touchpad once, twice, etc., holding a finer down on the touchpad, swiping the touchpad, etc., can also be detected and correlated to corresponding input commands used for selecting and/or otherwise interacting with graphical touch controls of a GUI displayed on the touchscreen 102.

The touchpad 702 can also include or be operatively coupled to the vibration unit 104. For example, the touchpad 702 can include one or more vibration motors and/or actuators built into the back panel of the touchpad. In other implementations, the physical element of the vehicle to which the touchpad is attached can comprise one or more vibration motors and/or actuators to cause the touchpad 702 and/or the area around the touchpad to vibrate in accordance with defined vibration feedback applied by the haptic feedback component 114 and the vibration unit 104.

With embodiments including a touchpad 702, in addition to and/or alternative to touching and moving a finger about the touchscreen 102 to select, interact with and/or activate applications/functions by displayed graphical elements, the user can interface with GUI displayed on the touchscreen 102 (or another display without touch functionality) using the touchpad 702. For example, the touchpad 702 can be operatively and communicatively coupled to the touchscreen 102 and allow a user to move a finger (or another object) on the touchpad 702 with defined motions and gestures to move a corresponding cursor (e.g., actual or virtual) about the GUI displayed on the touchscreen 102 to select and/or interact with the displayed graphical touch controls. Vibration feedback can further be provided to the user (e.g., via vibration unit 104) when a motion or movement on the touchpad 702 results in positioning of the cursor on or over a graphical touch control, when a motion or movement on the touchpad corresponds to a specific input command or resulting action (e.g., selection/activation, swiping left or right, etc.), and the like.

For example, using the touchpad 702, a user can move a finer (or fingers) about the touchpad to cause a corresponding cursor, selection tool, highlighting box, etc., to move about the GUI displayed on the touchscreen 102. When the cursor moves over a graphical touch control or the graphical touch control is otherwise targeted (e.g., via movement of a highlighting box from one graphical element to the next), the haptic feedback component 114 can cause the vibration unit 104 to vibrate, thereby indicating to the user when a graphical touch control has been reached. Based on detection of a vibration, the user can then tap on or press down on the touchpad 702 to select and/or activate the application or function represented by the graphical touch control. With these embodiments, the touchpad 702 can be located at a position within the vehicle that enables efficient and effective access by the driver without requiring the driver to take their eyes of the road, such as the steering wheel or on the middle console (e.g., between the front driver's seat and passenger seat).

Figure 8:
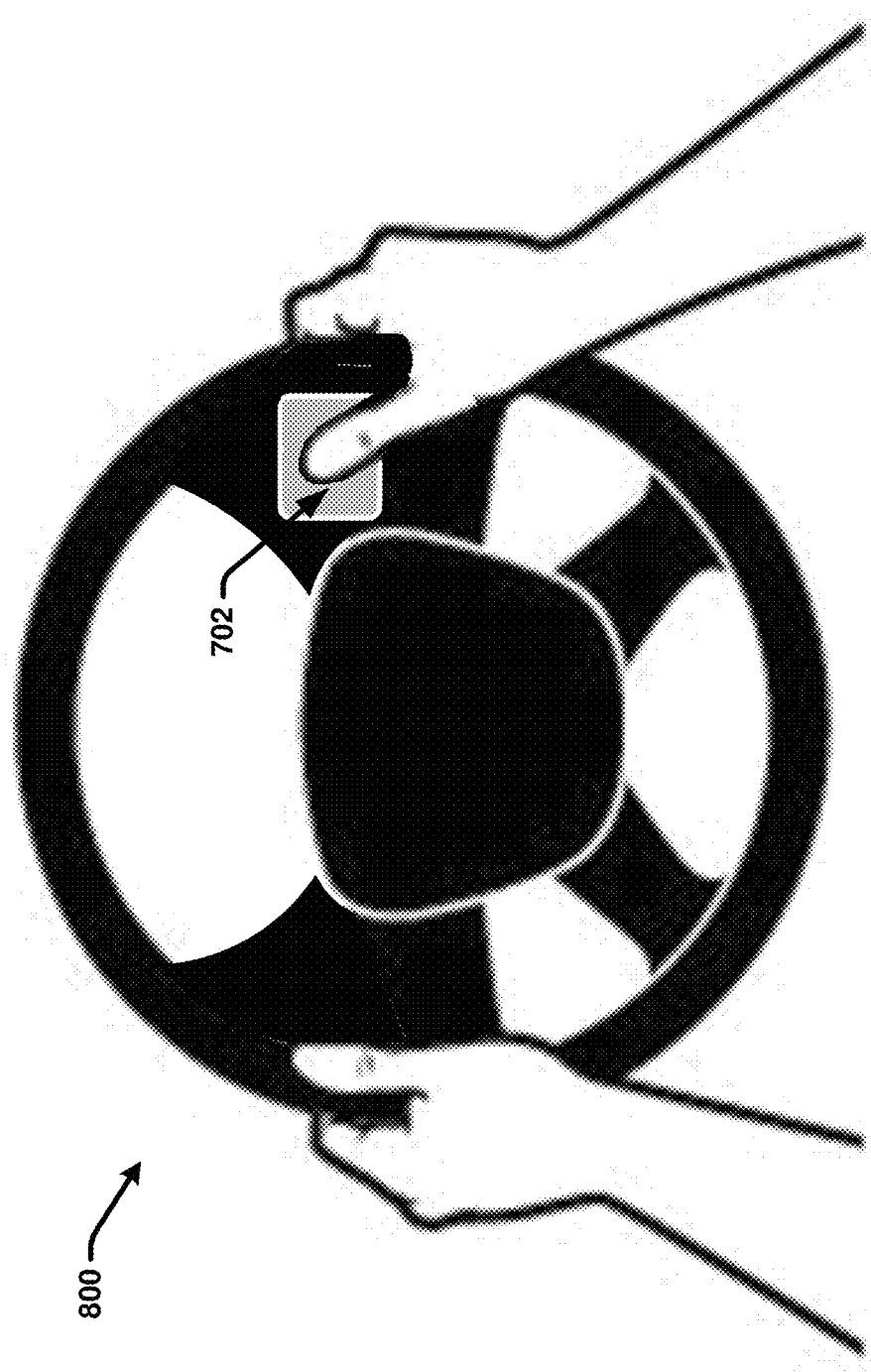
FIG. 8 presents an example illustration of a vehicle steering wheel with an integrated touchpad that facilitates interacting with a vehicle touchscreen in accordance with one or more embodiments of the disclosed subject matter.

For example, FIG. 8 presents an example illustration of a vehicle steering wheel 800 with an integrated touchpad (e.g., touchpad 702) that facilitates interacting with a vehicle touchscreen (e.g., touchscreen 102) in accordance with one or more embodiments of the disclosed subject matter. In the embodiment shown, the touchpad 702 is located on the upper right side of the vehicle steering wheel 800. With this position, the driver can easily move their thumb (or another finger) about the touchpad without looking away from the road or taking their hands off the vehicle steering wheel 800. Using the touchpad 702, the driver can control selection and/or interaction with graphical elements displayed on a touchscreen 102 located on the center stack of the dashboard without looking at the touchpad 702 or the touchscreen 102 because vibration feedback can be provided to indicate the corresponding results of the touchpad interaction relative to the graphical touch controls displayed on the touchscreen 102. In this regard, the touchpad 702, the vehicle steering wheel 800 and/or the driver's seat including the vibration unit 104 can vibrate to provide vibration feedback based on the motions and/or gestures performed on the touchpad resulting in a desired response on the touchscreen (e.g., movement of a cursor or other type of selection element on or over a graphical touch control, selection of the graphical element by pressing or tapping on the touchpad, swiping of the touchpad to move to a new page, etc.). Audio feedback can also be provided (e.g., by the audio feedback component 706) in conjunction with the vibration feedback in association with using the touchpad 702 to interface with the touchscreen 102.

Figure 9:
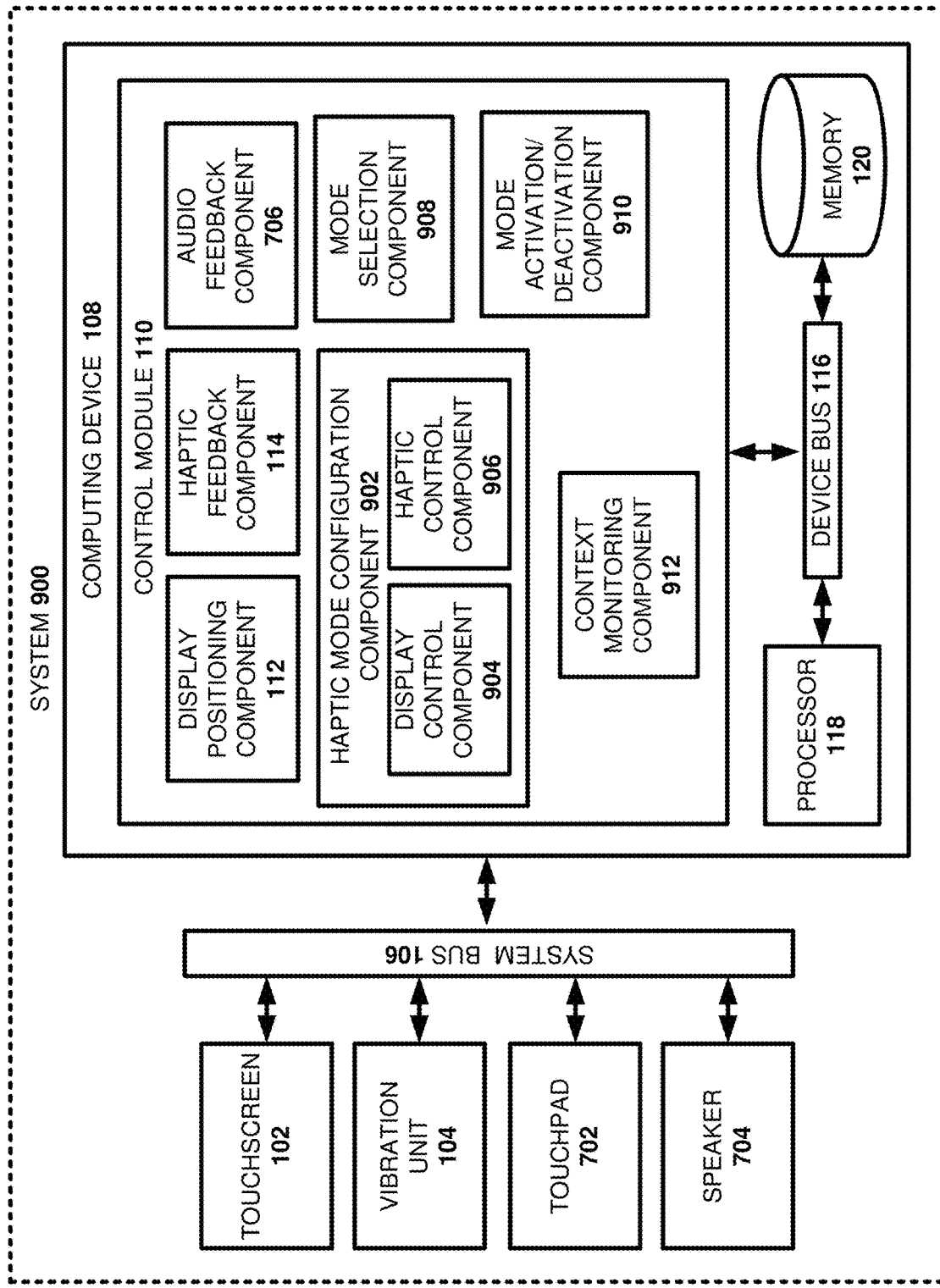
FIG. 9 illustrates a block diagram of another example, non-limiting system that facilitates interacting with a touchscreen of a vehicle using haptic feedback in accordance with one or more embodiments of the disclosed subject matter.

FIG. 9 illustrates a block diagram of another example, non-limiting system 900 that facilitates interacting with a touchscreen (e.g., touchscreen 102, touchscreen 602 and the like) of a vehicle using haptic feedback in accordance with one or more embodiments of the disclosed subject matter. System 900 includes same or similar features and functionalities as system 700 with the addition of some computer executable components to the control module 110. These additional computer executable components include haptic mode configuration component 902, display control component 904, mode selection component 908, mode activation/deactivation component 910 and context monitoring component 912. Like system 100 and system 700, system 900 can be deployed on or within a vehicle (e.g., automobile 122) or another suitable environment. Repetitive description of like elements employed in respective embodiments is omitted for sake of brevity.

In one or more embodiments, the touchscreen 102 (and/or touchscreen 602) can be interacted with using different modes. For example, the different modes can include at least a haptic feedback mode wherein haptic feedback is provided in association with interfacing with touchscreen 102 (and/or touchscreen 602), and a visual mode wherein haptic feedback is not provided. In some embodiments, the haptic feedback mode can also differ from the visual mode with respect to the configuration of GUIs that are provided to the user. For example, in haptic feedback mode, the specific graphical elements (and their corresponding applications or functions) that are displayed on respective GUI pages, the arrangement of the graphical elements, the number of graphical elements, the size and shape of the graphical elements, the spacing of the graphical elements and the like, can be tailored to facilitate interfacing with the GUI using haptic feedback (e.g., without looking at the screen) as opposed to interfacing with the GUI while looking at the GUI. In this regard, the haptic feedback mode can employ more simplified or streamlined GUIs relative to the visual mode such that graphical elements displayed can be more easily differentiated by vibration feedback. For example, relative to the visual mode, the one or more GUIs displayed in the haptic feedback mode can include fewer graphical element on each GUI page, larger graphical elements, greater spacing between the graphical elements, and the like.

Figure 10:
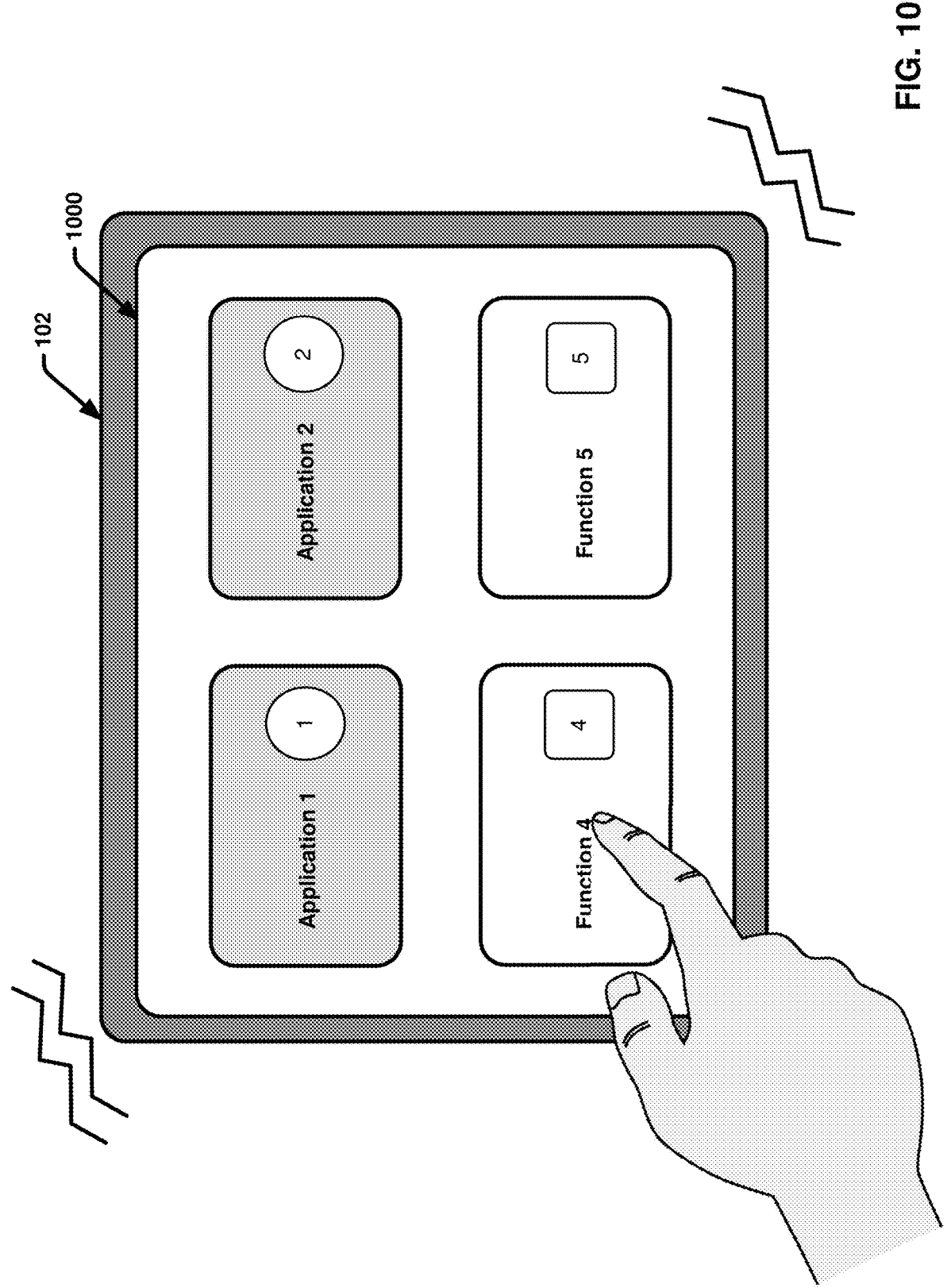
FIG. 10 presents an illustration of an example GUI that can be displayed on a vehicle touchscreen in accordance with a haptic feedback mode for interacting with the vehicle touchscreen in accordance with one or more embodiments of the disclosed subject matter.

For example, FIG. 10 presents an illustration of an example GUI 1000 that can be displayed on a vehicle touchscreen in accordance with a haptic feedback mode for interacting with the vehicle touchscreen in accordance with one or more embodiments of the disclosed subject matter. Repetitive description of like elements employed in respective embodiments is omitted for sake of brevity.

In the embodiment shown, GUI 1000 comprises only four graphical elements for four different functions or applications. Compared to GUI 500 for example which includes fifteen graphical elements, GUI 1000 is much simpler, includes larger graphical elements and uses greater spacing between the graphical elements. For example, with GUI 1000 as opposed to GUI 500, a user can more easily differentiate between the graphical elements displayed on the touchscreen using vibration feedback knowing a different graphical element is provided in only each of the four corners of the touchscreen 102. In this regard, a more detailed GUI such as GUI 500 can be displayed in visual mode, while a more simplified GUI such as GUI 1000 can be displayed in haptic feedback mode. For instance, with GUI 500, a user can easily feel and differentiate between the four graphical touch controls knowing there is a single graphical touch control in each corner of the screen.

With reference again to FIG. 9, in addition to a more streamlined GUI relative to a GUI used during the visual mode, the specific applications and/or functions (e.g., as represented by graphical touch controls) selected for display on respective pages of a GUI during haptic feedback mode can be tailored based preferences of the driver and/or relevance/importance of the respective applications and/or functions. In particular, because the haptic feedback mode is designed to be used by a driver of a vehicle while driving, the specific graphical elements that are included in respective GUI pages of the haptic mode can be selected based on relevance and importance to the driver while operating the vehicle during the haptic feedback mode. For example, in implementations in which the haptic feedback mode employs GUIs with fewer graphical elements than the visual mode, the specific graphical elements that are included on the primary or home screen can include graphical elements for the first "n" most relevant/important applications or functions, the next screen to the right can include graphical elements for the next "n" most relevant/important applications or functions, and so on, wherein n can be a defined integer (e.g., four).

In some implementations, the degree of relevance/importance of the available applications or functions that can be displayed during haptic feedback mode can be predefined (e.g., set by a system administrator, the user, the haptic mode configuration component 902, and the like etc.). In other implementations, the degree of relevance/importance of the available applications or functions that can be displayed during haptic feedback mode can adapt or change dynamically based on user preferences and/or context. For example, different users can have different preferences regarding what applications and/or functions are most important/relevant to them while driving. In addition, the relative importance of the available applications and/or functions can vary based on context of the vehicle and/or the user. For example, the relative importance of the available applications and/or functions can vary based on contextual factors such as but not limited to: driving mode or mobility state (e.g., drive, parked, neutral, reverse, automatic, manual, etc.), speed, location, route, time of day, traffic levels, traffic events/conditions, weather, terrain conditions, number of other passengers in the vehicle, identity of the other passengers, demographics of the other passengers. With these implementations, the ranking and/or relative importance of the available applications and/or functions can vary based on user preferences and/or context.

In one or more embodiments, the haptic feedback mode can be configurable by a user (e.g., the driver, the system administrator, etc.). With these embodiments, the haptic mode configuration component 902 can allow a user to select and set the various settings of the haptic feedback mode, including but not limited to: the specific graphical elements (and corresponding functions/applications) to display on respective pages of the GUI, the number of graphical elements to display, the arrangement or order of the graphical elements, the size and shape of the graphical elements, the spacing between the graphical elements, and the type/pattern of vibration to apply to respective graphical elements (and/or the applications or functions represented by the graphical elements), to apply to respective graphical pages, and/or to apply to respective input commands.

In other embodiments, the haptic mode configuration component 902 can automatically determine and apply the various configuration setting of the haptic feedback mode based on user preferences and/or context. For example, the haptic mode configuration component 902 can include display control component 904 to determine and/or select, based on user preferences and/or context of the vehicle, the specific graphical elements (and corresponding functions/applications) to display on respective pages of the GUI in haptic feedback mode, the number of graphical elements to display, the arrangement or order of the graphical elements, the size and shape of the graphical elements, the spacing between the graphical elements, and the like. The display control component 904 can further configure the GUI, generate the GUI, or adapt the GUI rendered on the vehicle touchscreen accordingly. The haptic mode configuration component 902 can also include haptic control component 906 to determine and/or select the type/pattern of vibration feedback to apply to respective graphical elements (and/or the applications or functions represented by the graphical elements), to apply to respective graphical pages, to apply to respective input commands, and the like. For example, based on user preferences and/or context, the haptic control component 906 can determine the specific vibration type/pattern to apply based on interaction with respective graphical touch control display via the GUI, the specific vibration type/pattern to apply to different GUI pages, the source of the vibration feedback (e.g., using a vibration unit included with the touchscreen, a vibration unit on the steering wheel, a vibration unit in the driver's seat, etc.).

Figure 11:
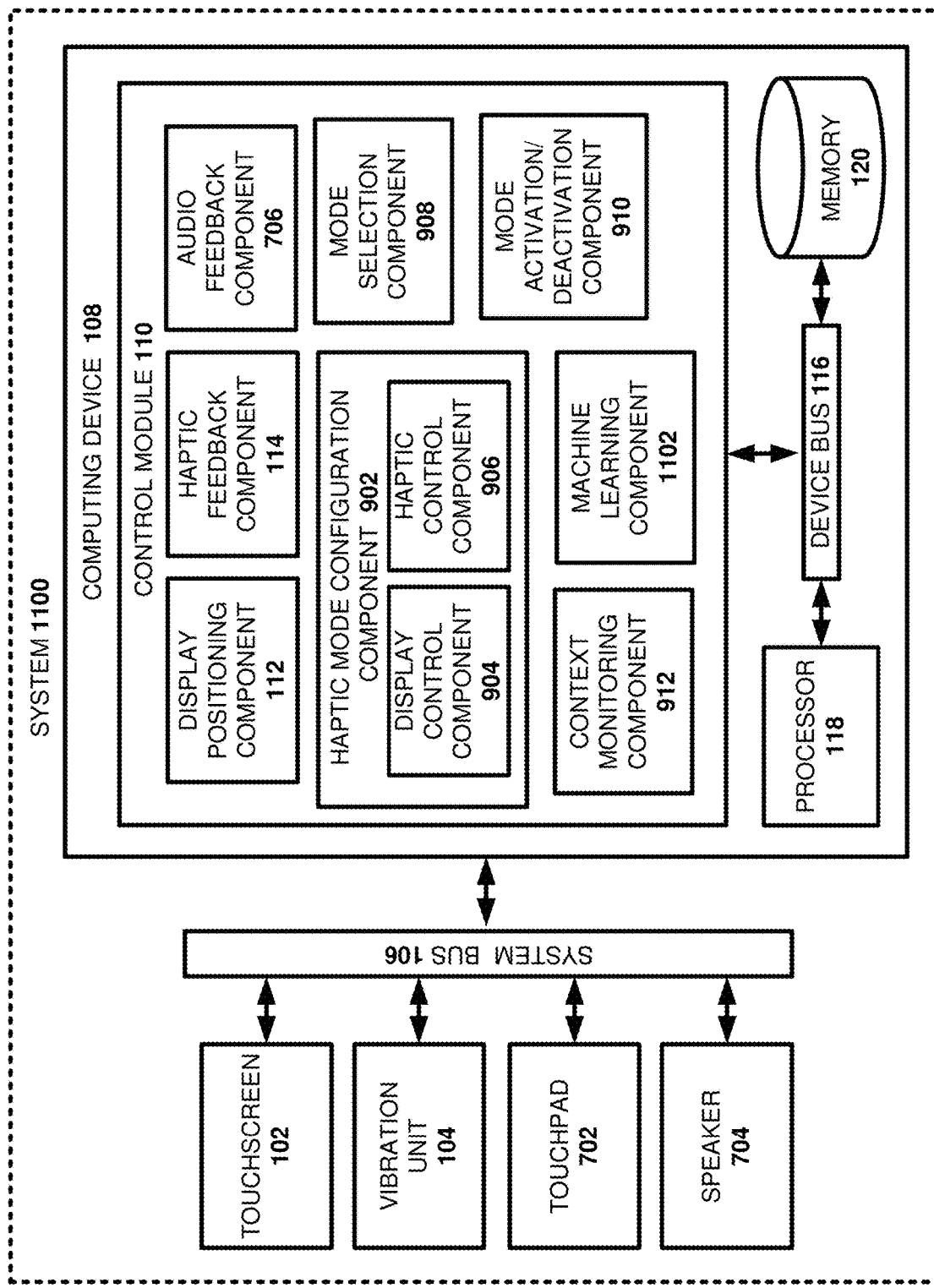
FIG. 11 illustrates a block diagram of another example, non-limiting system that facilitates interacting with a touchscreen of a vehicle using haptic feedback in accordance with one or more embodiments of the disclosed subject matter.

The manner in which the haptic mode configuration component 902 configures the settings (e.g., the GUI configuration applied the display control component 904, and/or vibration setting as applied by the haptic control component 906) of the haptic feedback mode based on user preferences and/or context can be predefined and/or learned using machine learning and artificial intelligence, (as described in greater detail infra with reference to FIG. 11 and machine learning component 1102). For example, in some embodiments, the display control component 904 can determine and/or receive information (e.g., from the machine learning component 1102) that defines the relative importance of available applications and/or functions to a particular user (e.g., driver) interfacing with the touchscreen 102 based on the user's preferences and configure the one or more GUIs of the haptic feedback mode accordingly. For instance, based on user preference information that ranks the relative importance of available applications and/or functions of the vehicle that can be controlled via the touchscreen 102, the display control component 904 can select a subset of the applications and/or functions to include in the GUI (e.g., in the primary home screen, on the next GUI page, etc.) that are the highest ranked (e.g., the top n applications/functions). The user preference information can also include preferences regarding other haptic feedback mode settings, such as the number of graphical elements, the order of graphical elements, the arrangement of the graphical elements, the size of the graphical elements, types of vibration feedback, and the like. Thus, in some embodiments, the display control component 904 can configure the GUI rendered on the vehicle touchscreen during the haptic feedback mode as applied to a particular user based on these additional preferences.

The display control component 904 and/or the haptic control component 906 can also configure the haptic feedback mode GUI configuration and/or vibration feedback, respectively based on context. For example, the haptic mode display control component 904 can determine the importance/relevance of applications and/or functions to specific contexts of the user (e.g., driver) and/or the vehicle and configure the GUIs accordingly. For instance, the display control component 904 can determine the importance/relevance of available applications and/or functions based on one or more contextual parameters such as but not limited to: driving mode or mobility state, speed, location, route, time of day, traffic levels, traffic events/conditions, weather, terrain conditions, number of other passengers in the vehicle, identity of the other passengers, demographics of the other passengers. The display control component 904 can also determine other haptic feedback mode GUI configuration settings based on such contextual factors. For example, the display control component 904 can tailor the number, size and arrangement of graphical elements displayed on respective GUIs of the haptic feedback mode based on contextual factors. In other example, the haptic control component 906 can tailor the type/pattern of vibration feedback based on context (e.g., intensity, source of the vibration, etc.).

The display control component 904 can also control the brightness of the touchscreen display based on activation of the haptic feedback mode, user preferences associated with the haptic feedback mode, and/or a context of the vehicle. For example, in some embodiments, based on activation of the haptic feedback mode, the display control component 904 can dim (e.g., lower) the brightness of the touchscreen display (e.g., touchscreen 102) to minimize driver distraction. In another example, the display control component 904 can dim the display based on activation of the haptic feedback mode and/or based on a determination that weather conditions are hazardous, traffic is high, or another contextual factor or combination of contextual factors. In another example, in which the system employs both a primary touchscreen on the dashboard (e.g., touchscreen 102) and a secondary touchscreen on the steering wheel or another more accessible location (e.g., touchscreen 602), and the haptic feedback mode is applied to the secondary touchscreen, the display control component 904 can also adjust or control the settings of the primary display based on context. For example, if the haptic feedback mode is activated on the secondary screen and the weather conditions are hazardous, the haptic mode configuration component 902 can dim or turn off the primary touchscreen (e.g., touchscreen 102) to minimize driver distraction.

In accordance with embodiments in which the haptic feedback mode can vary based on context, the control module 110 can include context monitoring component 912 to monitor and determine contextual parameters (e.g., those noted above and similar contextual parameters) in association with operation of the vehicle to facilitate configuring and/or adapting the settings of the haptic feedback mode accordingly. In some embodiments, the haptic mode configuration component 902 can dynamically adapt and/or configure the haptic feedback mode settings based on changes in context parameters. In this regard, as the context parameters change over a course of operation of the vehicle, the setting of the haptic feedback mode can also dynamically change.

The mode selection component 908 can facilitate selecting a particular mode for interacting with the touchscreen 102 (and/or touchscreen 602). For example, in some embodiments, the mode selection component 908 can allow a user (e.g., a driver) to provide input selecting a desired mode of operation (e.g., haptic feedback mode, visual mode, or another mode). With these embodiments, the user can choose whether to activate or deactivate the haptic feedback mode.

In other embodiments, the mode activation/deactivation component 910 can control activation and deactivation of different modes for interfacing with the touchscreen 102 (and/or touchscreen 602) based on context and/or user preferences. For example, in some embodiments, the mode activation/deactivation component 910 can automatically activate and deactivate the haptic feedback mode based on the mobility state of the vehicle. For instance, the mode activation/deactivation component 910 can activate the haptic feedback mode when the vehicle is moving or when the vehicle is moving at a particular speed (e.g., greater than a defined threshold). The mode activation/deactivation component 910 can also deactivate the haptic feedback mode and activate the visual mode (or another mode) based on the vehicle being parked, idle, or otherwise in a mobility state that is classified as safe for operating the touchscreen in visual mode. In another implementation, the mode activation/deactivation component 910 can automatically activate and deactivate the haptic feedback mode based on weather, road conditions, traffic levels, and the like. For example, if the weather is considered poor, the road conditions considered hazardous, and/or the traffic levels are high, the mode activation/deactivation component 910 can automatically activate the haptic feedback mode. The mode activation/deactivation component 910 can automatically activate and deactivate the haptic feedback mode based on user preferences regarding when the user prefers the haptic feedback mode to be activated and deactivated. For example, if a driver prefers to use haptic feedback mode only at night, the mode activation/deactivation component 910 can automatically activate and deactivate the haptic feedback mode accordingly. In some embodiments, the preferences can be provided and/or defined by the user (e.g., the driver). In other embodiments, the preferences for a particular user can be determined using one or more machine learning techniques, as describe in greater detail with reference to FIG. 11.

FIG. 11 illustrates a block diagram of another example, non-limiting system 1100 that facilitates interacting with a touchscreen of a vehicle using haptic feedback in accordance with one or more embodiments of the disclosed subject matter. System 1100 includes same or similar features and functionalities as system 900 with the addition of machine learning component 1102 to the control module 110. Like system 100, system 700, and system 900, system 1100 can be deployed on or within a vehicle (e.g., automobile 122) or another suitable environment. Repetitive description of like elements employed in respective embodiments is omitted for sake of brevity.

As described above, in one or more embodiments, the haptic mode configuration component 902 and/or the mode activation/deactivation component 910 can control the settings and activation/deactivation of the haptic feedback mode based on user preferences and context of the user and/or the vehicle. In accordance with these embodiments, system 1100 can include machine learning component 1102 to facilitate learning user preferences and behaviors in association with various operating contexts of a vehicle to facilitate determinations and inferences by the haptic mode configuration component 902 and/or the mode activation/deactivation component 910 regarding how to configure the haptic feedback mode settings and/or when to activate and/or deactivate the haptic feedback mode.

For example, by monitoring user usage behavior in association with operating the vehicle in visual and haptic feedback mode, the machine learning component 1102 can learn user preferences regarding relative importance of respective applications and/or functions in different contextual scenarios. These learned preferences can be used by the machine learning component 1102 and/or the display control component 904 to determine and/or infer what applications and/or functions to display (e.g., using their corresponding graphical elements) on respective GUIs of the haptic feedback mode and when to display them. These learned preferences can be collective for all users, specific to individual users, specific to defined user groups (e.g., grouped by vehicle type, grouped by one or more demographic characteristics, and the like). For example, in some embodiments, the machine learning component 1102 can monitor usage of the vehicle touchscreen by a specific driver to learn patterns regarding specific applications/functions accessed and controlled via the vehicle touchscreen used by the driver in association with different contexts of the vehicle, frequently used applications/functions, applications/functions used that result in heightened driver distraction, and the like. The machine learning component 1102 can further infer or determine, based on machine learning analysis of the patterns, specific applications/functions to represent in the haptic feedback mode GUI in association with specific contexts of the vehicle (e.g., wherein the contexts of the vehicle can be based on one or more of the following factors: a driving mode or mobility state of the vehicle (e.g., drive, parked, neutral, reverse, automatic, manual, etc.), vehicle speed, vehicle location, route, time of day, traffic levels, traffic events/conditions, weather, terrain conditions, number of other passengers in the vehicle, identity of the other passengers, demographics of the other passengers and the like). In some embodiments, the machine learning component 1102 can further access and employ usage information gather for a plurality of drivers regarding usage of touchscreen accessible vehicle applications/functions in various contexts to determine and/or rank the applications/functions based on relevance to vehicle context and preferred use. The display control component 904 can further tailor the haptic feedback GUI based on this ranking information.

The machine learning component 1102 can also learn user preferences regarding haptic feedback mode GUI configuration with respect to optimal number, size, and arrangement of graphical touch controls for the haptic feedback mode in association with different contextual scenarios based on monitoring usage patterns with different haptic feedback mode configurations. These learned preferences can also take into account patterns in gesture tendencies of users (e.g., how they generally move their finger or fingers relative to the screen), size of the user's finger, and the like. Based on these learned preferences and user behaviors, the machine learning component 1102 and/or the display control component 904 can determine optimal haptic feedback GUI configurations (e.g., optimal size, number, size and arrangement of graphical touch controls) in different contextual scenarios that facilitate efficiently and effectively interfacing with the touchscreen based on vibration feedback (e.g., without looking at the screen) as opposed to visual feedback. These optimal configurations can be based on collective preferences/behaviors of all users, specific to individual users, and/or specific to defined user groups (e.g., grouped by vehicle type, grouped by one or more demographic characteristics, and the like). The machine learning component 1102 can similarly learn patterns in user responses to vibration feedback stimuli to facilitate determining, by the haptic control component 906, when and how to apply the vibration stimuli in association with the haptic feedback mode. The machine learning component 1102 can also learn user behaviors and responses in association with using the haptic feedback mode or the visual mode (or another mode) in different contexts to determine when to activate and deactivate the respective modes. For example, the machine learning component 1102 can learn when to automatically activate the haptic feedback mode based on a context of the vehicle and/or preferences of the user. Again, these preferences can be specific to all users, defined groups of users, and/or individual users.

In this regard, the machine learning component 1102 can perform classifications, correlations, inferences and/or expressions associated with principles of artificial intelligence. For instance, the machine learning component 1102 can employ an automatic classification system and/or an automatic classification. In one example, the machine learning component 1102 can employ a probabilistic and/or statistical-based analysis (e.g., factoring into the analysis utilities and costs) to learn and/or generate inferences. The machine learning component 1102 can employ any suitable machine-learning based techniques, statistical-based techniques and/or probabilistic-based techniques. For example, the machine learning component 1102 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the machine learning component 1102 can perform a set of machine learning computations. For example, the machine learning component 1102 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 12:
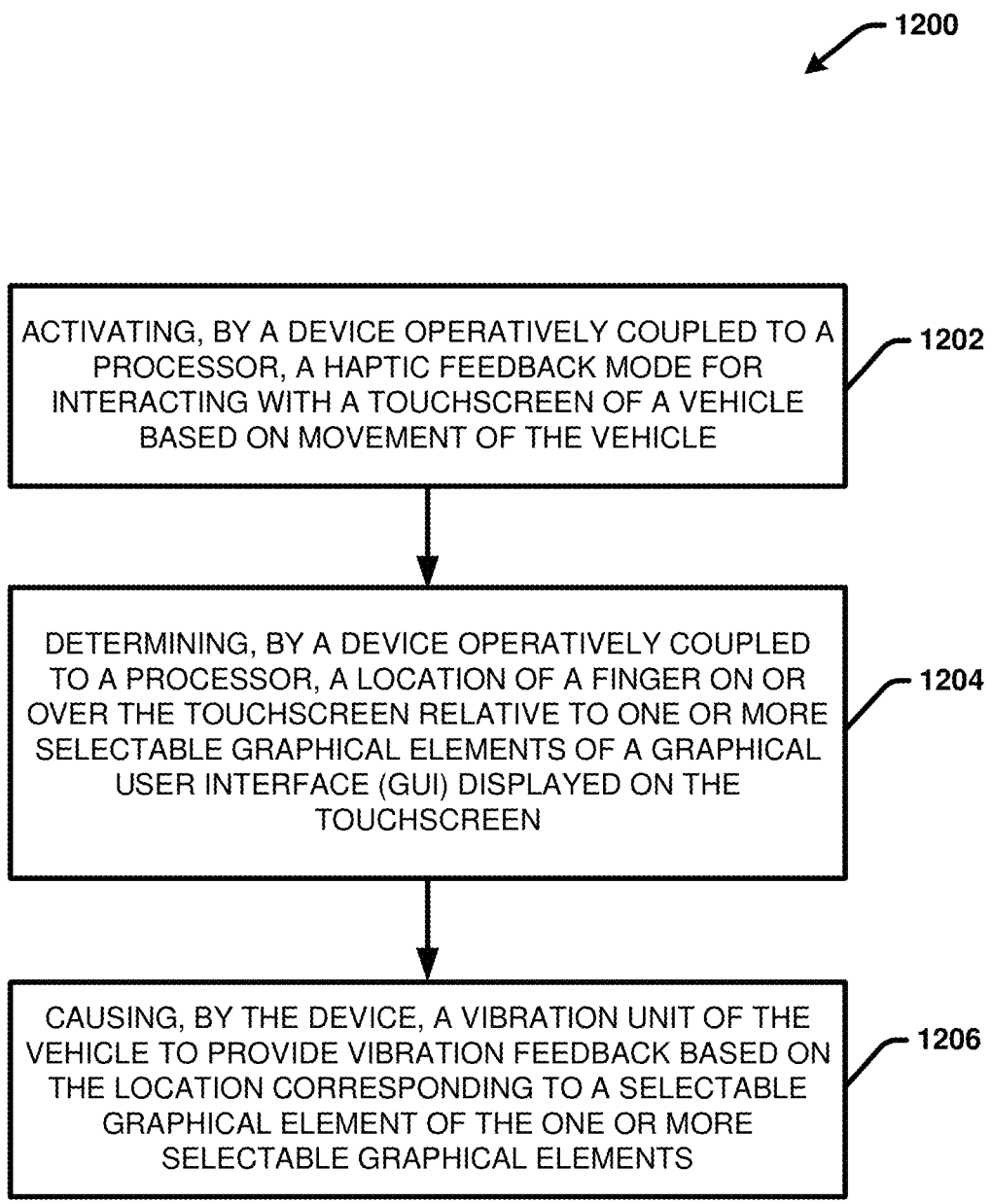
FIG. 12 provides a high-level flow diagram of an example computer-implemented process for using haptic feedback to indicate the location of a finger relative to graphical touch controls displayed on a vehicle touchscreen in accordance with one or more embodiments of the disclosed subject matter.

FIG. 12 provides a high-level flow diagram of another example computer-implemented process 1200 for using haptic feedback to indicate the location of a finger relative to graphical touch controls displayed on a vehicle touchscreen in accordance with one or more embodiments of the disclosed subject matter. Repetitive description of like elements employed in respective embodiments is omitted for sake of brevity.

At 1202, a device operatively coupled to a processor (e.g., computing device 108) can activate a haptic feedback mode to interact with a touchscreen of a vehicle based on movement of the vehicle (e.g., using mode activation/deactivation component 910). At 1204, the device can further determine a location of a finger on or over a touchscreen (e.g., touchscreen 102 and/or touchscreen 602) of a vehicle relative to one or more graphical touch controls of a GUI displayed on the touchscreen (e.g., using display positioning component 112). At 1204, the device can further cause (e.g., using haptic feedback component 114) a vibration unit (e.g., vibration unit 104) of the vehicle to provide vibration feedback based on the location corresponding to a graphical touch control of the one or more graphical touch controls.

Figure 13:
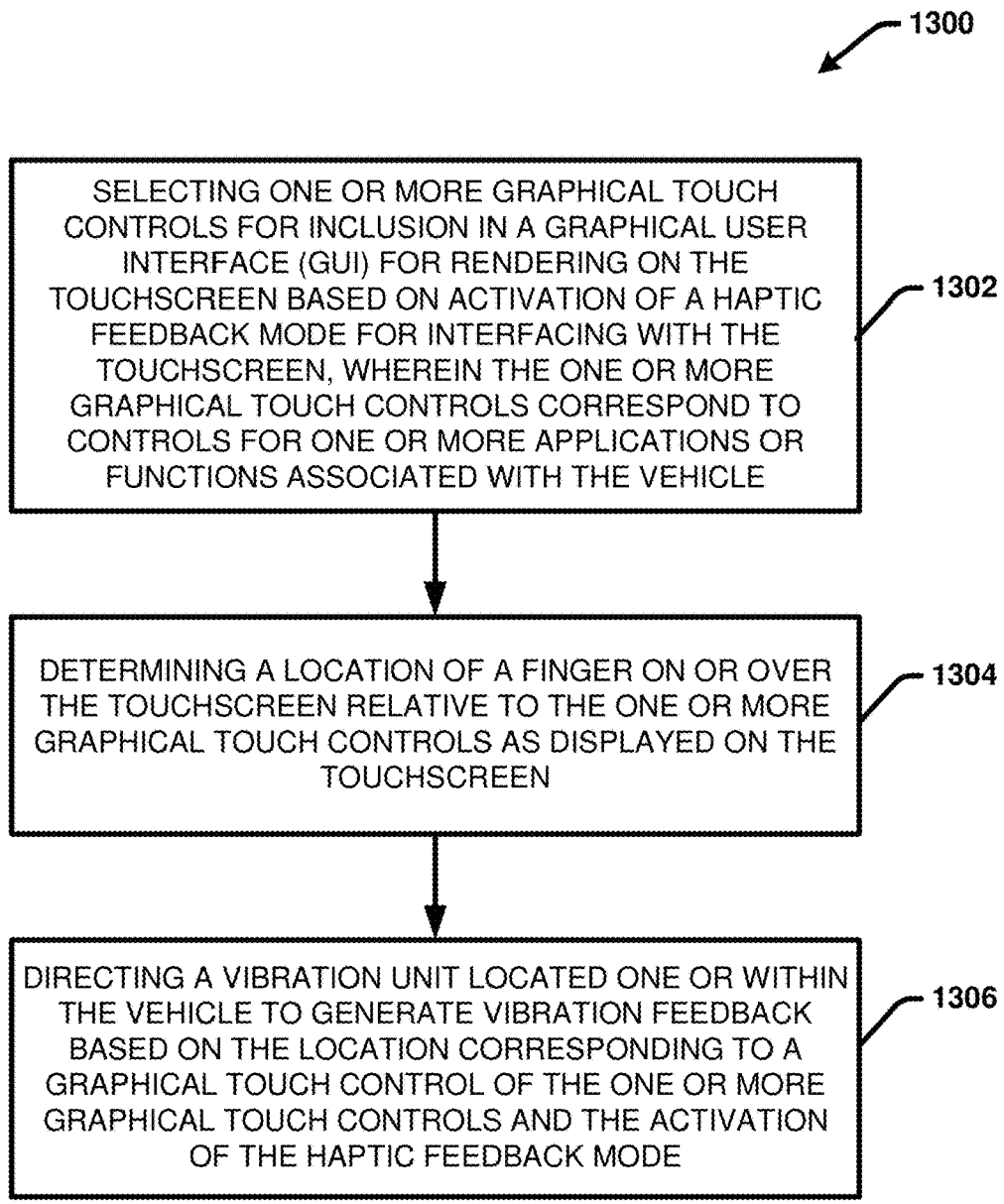
FIG. 13 provides a high-level flow diagram of another example computer-implemented process for using haptic feedback to indicate the location of a finger relative to graphical touch controls displayed on a vehicle touchscreen in accordance with one or more embodiments of the disclosed subject matter.

FIG. 13 provides a high-level flow diagram of another example computer-implemented process 1300 for using haptic a feedback mode to facilitate interfacing with a vehicle touchscreen in accordance with one or more embodiments of the disclosed subject matter. Repetitive description of like elements employed in respective embodiments is omitted for sake of brevity.

At 1302, a control module operatively coupled to a processor (e.g., control module 110) selects one or more graphical touch controls to include in a GUI for rendering on the touchscreen based on activation of a haptic feedback mode for interfacing with the touchscreen, wherein the one or more graphical touch controls correspond to controls for one or more applications or functions associated with the vehicle (e.g., using display control component 904). At 1304, the control module can determine a location of a finger on or over the touchscreen relative to the one or more graphical touch controls as displayed on the touchscreen (e.g., using display positioning component 112). At 1306, the control module can direct a vibration unit located on or within the vehicle to generate vibration feedback based on the location corresponding to a graphical touch control of the one or more graphical touch controls and the activation of the haptic feedback mode (e.g., using haptic feedback component 114).

Figure 14:
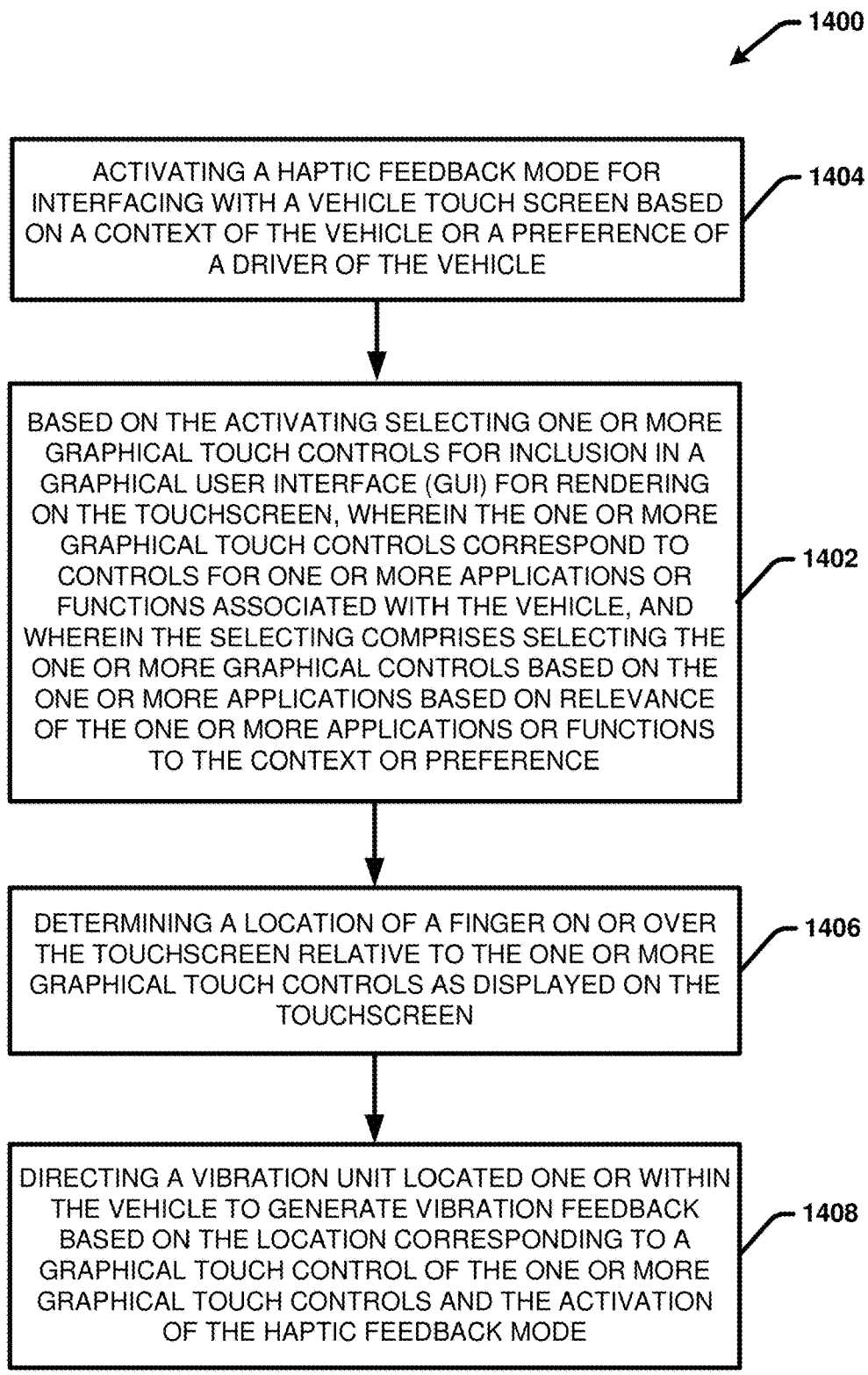
FIG. 14 provides a high-level flow diagram of another example computer-implemented process for using haptic feedback to indicate the location of a finger relative to graphical touch controls displayed on a vehicle touchscreen in accordance with one or more embodiments of the disclosed subject matter.

FIG. 14 provides a high-level flow diagram of another example computer-implemented process 1300 for using haptic a feedback mode to facilitate interfacing with a vehicle touchscreen in accordance with one or more embodiments of the disclosed subject matter. Repetitive description of like elements employed in respective embodiments is omitted for sake of brevity.

At 1402, a control module operatively coupled to a processor (e.g., control module 110) activates a haptic feedback mode for interfacing with a vehicle touchscreen based on a context of the vehicle or a preference of a driver of the vehicle (e.g., by mode activation/deactivation component 910). In various embodiments, the preference and/or context that warrants activation of the haptic feedback mode can be determined using one or more machine learning techniques (e.g., by machine learning component 1102). At 1404, based on activation of the haptic feedback mode, the control module selects one or more graphical touch controls to include in a GUI for rendering on the touchscreen wherein the one or more graphical touch controls correspond to controls for one or more applications or functions associated with the vehicle, and wherein the selecting the one or more controls based on relevance to of the one or more applications or functions to the context or preference (e.g., using display control component 904). In various embodiments, the relevance of the one or more applications or functions to the context or preference can also be determined using one or more machine learning techniques (e.g., by machine learning component 1102). At 1406, the control module can determine a location of a finger on or over the touchscreen relative to the one or more graphical touch controls as displayed on the touchscreen (e.g., using display positioning component 112). At 1408, the control module can direct a vibration unit located on or within the vehicle to generate vibration feedback based on the location corresponding to a graphical touch control of the one or more graphical touch controls and the activation of the haptic feedback mode (e.g., using haptic feedback component 114).

The one or more embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
a processor; and
a memory communicatively coupled to the processor, the memory having stored therein computer-executable instructions, comprising:

a display control component that renders, on a touchscreen of a vehicle, a graphical user interface comprising graphical touch controls on the touchscreen, wherein the graphical touch controls correspond to controls for at least one of applications or functions associated with the vehicle; and a haptic feedback component that, in response to a current vehicle context of the vehicle meeting a defined criterion, activates a haptic feedback mode of the graphical user interface, wherein the haptic feedback mode comprises a subset of the graphical touch controls relevant to the current vehicle context, and the haptic feedback mode increases respective sizes of the subset of the graphical touch controls according to behaviors of a driver of the vehicle learned by a machine learning model to facilitate easier selection of the subset of the graphical touch controls using haptic feedback.

2. The system of claim 1, wherein the haptic feedback mode causes a vibration unit of the vehicle to provide vibration feedback based on a graphical touch control of the subset of the graphical touch controls corresponding to a location of the touchscreen activated by a body part.

3. The system of claim 1, wherein the defined criterion is the current vehicle context comprising a particular driving mode of the vehicle.

4. The system of claim 1, wherein the defined criterion is the current vehicle context comprising a particular location of the vehicle.

5. The system of claim 1, wherein the defined criterion is the current vehicle context comprising a particular level of traffic within a defined area of the vehicle.

6. The system of claim 1, wherein the defined criterion is the current vehicle context comprising a particular weather condition within a defined area of the vehicle.

7. The system of claim 1, wherein the defined criterion is the current vehicle context comprising a particular route of the vehicle.

8. A method, comprising:
rendering, by a system comprising a processor, on a touchscreen of a vehicle, a graphical user interface comprising graphical touch controls on the touchscreen, wherein the graphical touch controls correspond to controls for at least one of applications or functions associated with the vehicle; and in response to a current vehicle context of the vehicle satisfying a defined criterion, activating, by the system, a haptic feedback mode of the graphical user interface, wherein the haptic feedback mode comprises a subset of the graphical touch controls relevant to the current vehicle context, and the haptic feedback mode increases respective sizes of the subset of the graphical touch controls according to behaviors of a driver of the vehicle learned by a machine learning model to facilitate easier selection of the subset of the graphical touch controls using haptic feedback.

9. The method of claim 8, wherein the haptic feedback mode causes a vibration unit of the vehicle to provide vibration feedback based on a graphical touch control of the subset of the graphical touch controls corresponding to a location of the touchscreen activated by a body part.

10. The method of claim 8, wherein the defined criterion is the current vehicle context comprising a particular driving mode of the vehicle.

11. The method of claim 8, wherein the defined criterion is the current vehicle context comprising a particular location of the vehicle.

12. The method of claim 8, wherein the defined criterion is the current vehicle context comprising a particular level of traffic within a defined area of the vehicle.

13. The method of claim 8, wherein the defined criterion is the current vehicle context comprising a particular weather condition within a defined area of the vehicle.

14. The method of claim 8, wherein the defined criterion is the current vehicle context comprising a particular route of the vehicle.

15. A non-transitory computer-readable medium having instructions stored thereon that, in response to execution, cause a system including a processor to perform operations comprising:
rendering, on a touchscreen of a vehicle, a graphical user interface comprising graphical touch controls on the touchscreen, wherein the graphical touch controls correspond to controls for at least one of applications or functions associated with the vehicle; and in response to a current vehicle context of the vehicle matching a defined criterion, activating a haptic feedback mode of the graphical user interface, wherein the haptic feedback mode comprises a subset of the graphical touch controls relevant to the current vehicle context, and the haptic feedback mode increases respective sizes of the subset of the graphical touch controls according to behaviors of a driver of the vehicle learned by a machine learning model to facilitate easier selection of the subset of the graphical touch controls using haptic feedback.

16. The non-transitory computer-readable medium of claim 15, wherein the haptic feedback mode causes a vibration unit of the vehicle to provide vibration feedback based on a graphical touch control of the subset of the graphical touch controls corresponding to a location of the touchscreen activated by a body part.

17. The non-transitory computer-readable medium of claim 15, wherein the defined criterion is the current vehicle context comprising a particular driving mode of the vehicle.

18. The non-transitory computer-readable medium of claim 15, wherein the defined criterion is the current vehicle context comprising a particular location of the vehicle.

19. The non-transitory computer-readable medium of claim 15, wherein the defined criterion is the current vehicle context comprising a particular level of traffic within a defined area of the vehicle.

20. The non-transitory computer-readable medium of claim 15, wherein the defined criterion is the current vehicle context comprising a particular weather condition within a defined area of the vehicle.

* * * * *